(12) United States Patent
Kohara

(10) Patent No.: US 10,850,196 B2
(45) Date of Patent: Dec. 1, 2020

(54) TERMINAL DEVICE

(71) Applicant: BANDAI NAMCO ENTERTAINMENT INC., Tokyo (JP)

(72) Inventor: Takashi Kohara, Sagamihara (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/735,511

(22) PCT Filed: Jun. 9, 2016

(86) PCT No.: PCT/JP2016/067248
§ 371 (c)(1),
(2) Date: Dec. 11, 2017

(87) PCT Pub. No.: WO2016/199860
PCT Pub. Date: Dec. 15, 2016

(65) Prior Publication Data
US 2018/0161674 A1    Jun. 14, 2018

(30) Foreign Application Priority Data
Jun. 11, 2015 (JP) .................. 2015-118322

(51) Int. Cl.
*A63F 13/2145* (2014.01)
*A63F 13/426* (2014.01)
(Continued)

(52) U.S. Cl.
CPC ........ *A63F 13/426* (2014.09); *A63F 13/2145* (2014.09); *A63F 13/25* (2014.09);
(Continued)

(58) Field of Classification Search
CPC .... A63F 13/52; A63F 13/426; A63F 13/2145; A63F 2300/56; A63F 2300/1075; A63F 2300/646
See application file for complete search history.

(56) References Cited

U.S. PATENT DOCUMENTS 5,844,547 A * 12/1998 Minakuchi ............ G06F 3/0481
345/173
6,285,347 B1 * 9/2001 Watanabe ............. G06F 3/0485
345/672
(Continued)

FOREIGN PATENT DOCUMENTS

CN    103493000 A    1/2014
CN    104238942 A    12/2014
(Continued)

OTHER PUBLICATIONS

Aug. 30, 2016 International Search Report issued in International Patent Application No. PCT/JP2016/067248.

*Primary Examiner* — Steven J Hylinski
(74) *Attorney, Agent, or Firm* — Oliff PLC

(57) ABSTRACT

A terminal device controls a scroll display process for scrolling and moving a display region part of content displayed on a touch panel based on a slide operation input, and detects, during the slide operation input, any one input state of the number of slide operation inputs being simultaneously executed and the touch area involved in the touching on the touch panel for execution of the slide operation input, and controls a scrolling speed, which represents a moving speed exhibited when the display region part of the content is scrolled in the scroll display process, or a scroll movement amount, which represents a movement amount by which the content is scrolled, during the slide operation input based on the detected input state.

15 Claims, 17 Drawing Sheets

(51) Int. Cl.
*A63F 13/52* (2014.01)
*G06F 3/0488* (2013.01)
*A63F 13/25* (2014.01)
*A63F 13/92* (2014.01)
*G06F 3/041* (2006.01)
*G06F 3/0485* (2013.01)

(52) U.S. Cl.
CPC .............. *A63F 13/52* (2014.09); *A63F 13/92* (2014.09); *G06F 3/0416* (2013.01); *G06F 3/0485* (2013.01); *G06F 3/0488* (2013.01); *G06F 3/04883* (2013.01)

(56) References Cited

U.S. PATENT DOCUMENTS

| | | | | |
|---|---|---|---|---|
| 9,152,235 | B2* | 10/2015 | Wardenaar | G11B 27/34 |
| 9,477,311 | B2* | 10/2016 | Lazaridis | G06F 3/017 |
| 9,792,882 | B2* | 10/2017 | Jun | G09G 5/34 |
| 2005/0130738 | A1* | 6/2005 | Miyamoto | A63F 13/10 463/30 |
| 2005/0134578 | A1* | 6/2005 | Chambers | G06F 3/0485 345/184 |
| 2005/0202869 | A1* | 9/2005 | Miyamoto | A63F 13/26 463/36 |
| 2006/0258453 | A1* | 11/2006 | Kando | A63F 13/52 463/36 |
| 2006/0258455 | A1* | 11/2006 | Kando | A63F 13/10 463/36 |
| 2008/0291173 | A1* | 11/2008 | Suzuki | A63F 13/10 345/173 |
| 2009/0271723 | A1* | 10/2009 | Matsushima | G06F 3/0482 715/769 |
| 2010/0017732 | A1* | 1/2010 | Matsushima | G06F 9/451 715/765 |
| 2011/0306415 | A1* | 12/2011 | Tanaka | A63F 13/10 463/31 |
| 2012/0083337 | A1* | 4/2012 | Nanba | A63F 13/812 463/31 |
| 2012/0212429 | A1* | 8/2012 | Okura | G06F 3/04883 345/173 |
| 2012/0272181 | A1 | 10/2012 | Rogers et al. | |
| 2013/0169565 | A1* | 7/2013 | Funahashi | G06F 3/041 345/173 |
| 2013/0176250 | A1* | 7/2013 | Lee | G06F 3/013 345/173 |
| 2014/0111551 | A1* | 4/2014 | Suzuki | G06F 3/048 345/661 |
| 2014/0121012 | A1* | 5/2014 | Tagawa | A63F 13/06 463/31 |
| 2015/0128163 | A1* | 5/2015 | Cormican | H04N 21/4143 725/23 |
| 2015/0338942 | A1* | 11/2015 | Stone | G06F 3/0488 345/173 |
| 2016/0070428 | A1* | 3/2016 | Shen | G06F 3/0485 715/784 |
| 2016/0229052 | A1* | 8/2016 | Touma | B25J 13/06 |

FOREIGN PATENT DOCUMENTS

| | | |
|---|---|---|
| JP | 2007-257643 A | 10/2007 |
| JP | 2010-287121 A | 12/2010 |
| JP | 2011-248416 A | 12/2011 |
| JP | 2013-196142 A | 9/2013 |
| JP | 2014-102580 A | 6/2014 |
| JP | 2014-236817 A | 12/2014 |

* cited by examiner

TERMINAL DEVICE

TECHNICAL FIELD

The present invention relates to a terminal device and the like.

BACKGROUND ART

In recent years, an information communication terminal device such as a tablet-type information communication terminal device or a smartphone (hereinafter referred to as "portable communication terminal device") has been provided with various functions, enhanced in functions, and used widely, and has been increasingly used to play a game. Various portable terminal devices that can implement a game have been provided in addition to the portable communication terminal device.

Such a terminal device may be designed so that the user operates the terminal device using a controller (e.g., keyboard or numeric keypad), or may include a touch panel provided to a display screen, and may be designed so that the user operates the terminal device by touching the game display screen either indirectly (i.e., using a pointing device) or directly (hereinafter referred to as "touch operation").

In recent years, various devices other than a terminal device such as a personal computer are provided with a user interface that allows the user to perform a touch operation on the display screen. Such a user interface has been used for a device that implements a game so as to complement or replace a known interface (e.g., keyboard or numeric keypad).

In particular, in recent years, there is known a technology for changing, on such a terminal device, a scrolling speed on a screen being displayed based on an area of a depressed region, which is depressed in a touch operation (see, for example, PTL 1).

CITATION LIST

Patent Literature

PTL 1: JP-A-2013-196142

SUMMARY OF INVENTION

Technical Problem

However, in a game device described in PTL 1, the scrolling speed is changed based on the depressed region, which is depressed in the touch operation, but the change in scrolling speed is not associated with a slide operation input, and hence a scrolling direction of content being displayed and a display manner thereof cannot be changed. As a result, the content being displayed cannot be freely scrolled, that is, the scrolling direction cannot be freely changed.

The invention has been made in order to solve the above-mentioned problem, and has an object to provide a program, a terminal device, and the like, which enable content being displayed to be freely scrolled even when an operation using a touch panel is performed, and enable various operations for a scrolling speed, a scroll movement amount, or the like to be controlled by a simple operation.

Solution to Problem (1) In order to solve the problem, according to one embodiment of the invention, there is provided a terminal device for receiving a slide operation input that has been performed on a touch panel on which a given screen is displayed and to execute a game based on the received slide operation input, the terminal device including:

a touch operation detector that performs a first detection process for detecting one or more states in which a touch operation input is performed on the screen, and a second detection process for detecting, as the slide operation input, an input involved in a slide operation that has been performed on the touch panel to directly follow the touch operation input detected at a given position by the first detection process;

a display controller that controls a scroll display process for scrolling and moving a display region part of content displayed on the screen based on the slide operation input; and an input state detector that detects, when one or more slide operations have been input, any one input state of (A) a number of inputs involved in operation inputs including the slide operation input and the touch operation input and (B) an area of a region touched by the operation input, in which the display controller controls a scrolling speed, which represents a moving speed exhibited when the display region part of the content is scrolled in the scroll display process, or a scroll movement amount, which represents a movement amount by which the content is scrolled, during the slide operation input based on the detected input state.

With this configuration, during the slide operation input, the displayed game content can be freely scrolled in terms of the scrolling direction or the like, and the scrolling speed or the scroll movement amount to be used when the game content is scrolled and displayed can be controlled, based on the input state including the number of slide operation inputs or a touch area exhibited when the slide operation input is performed.

For example, the above embodiment enables to:

(A) reduce the number of slide operation inputs or reduce the touch area exhibited when the slide operation input is performed in a case where the movement is to be reduced, for example, in a case of finely correcting the display region of the game content; and (B) increase the number of slide operation inputs or increase the touch area exhibited when the slide operation input is performed in a case of quickly or greatly moving the display region part being displayed on the screen to the outside of the screen or displaying the non-display region or the non-display region spaced far apart from the display region.

Therefore, even when an operation is performed through use of the touch panel with which it is difficult to perform various operations, the above embodiment enables to control various operations for the scrolling speed, the scroll movement amount, or the like by a simple operation, and hence it is possible to provide an attractive game that utilizes a new operation using the touch panel.

Note that the terms "touch operation input" and "slide operation input" used herein include (a) a direct touch operation or slide operation on the touch panel that is performed with a finger of the user, (b) an indirect touch operation input or slide operation input on the touch panel that is performed using a device such as a pointing device, and (c) a touch operation or a slide operation that is determined by detecting a pseudo-operation (pseudo-touch operation or pseudo-slide operation) that is performed on the touch panel.

For example, the term "pseudo-touch operation" or "pseudo-slide operation" used herein includes a touch operation or a slide operation that is detected when the user has touched or approximately touched the touch panel, such as (c1) a touch operation or a slide operation that is determined based on coordinates when a light beam (e.g., infrared rays) is applied at a position close to the surface of the touch panel parallel to the surface of the touch panel, and the coordinates in the vertical direction and the horizontal direction at which the light beam is blocked when the user has touched or approximately touched the touch panel are detected using a plurality of irradiation sections (that are formed on one side of the touch panel in the vertical direction and the horizontal direction at a given interval) and a plurality of sensors (that make a pair with each irradiation section, are provided on the other side of the touch panel opposite to each irradiation section, and receive the applied light beam), and (c2) a touch operation or a slide operation that is determined based on position coordinates when a camera that captures the display screen of the touch panel is provided, and the position coordinates at which the user has touched or approximately touched the touch panel are detected using the camera.

The "content" represents content formed to be displayable on the screen of the touch panel, which includes a game or a menu for performing a given setting of a game or other such application, and is formed of a "display region part of the content" being a part to be displayed on the screen and a part to be hidden outside the screen (hereinafter also referred to as "non-display region part of the content").

The "scroll display process" represents, for example, a display process for:

(A) moving a position in the display region of content, at which a touch operation input has been detected, or a position on the touch panel relating thereto (hereinafter referred to as "reference position") toward a slide operation direction in association with a slide operation input;

(B) displaying a non-display region part of the content formed in a direction reverse to the slide operation direction, which is determined based on a slide operation amount and the input state exhibited in the slide operation input, on the screen in association with the movement; and (C) switching a display region part of the content formed and displayed in the slide operation direction, which has moved to the outside of the screen, to a non-display region part.

In particular, the scroll display process does not need to be executed along the slide operation input, that is, does not need to include moving the reference position in accordance with the slide operation amount of the slide operation input, and includes controlling the scrolling speed. Therefore, a movement amount of the reference position may differ from the slide operation amount.

The "number of inputs exhibited in the operation input including the slide operation input and the touch operation input" represents, for example, the number of fingers that are executing the touch operation input, the slide operation input, or both the operation inputs (i.e., that are touching the screen) when the slide operation input is being performed by the fingers of a player. The "touch area" represents, for example, a size of an area of a spot on the screen, which is being touched by the touch operation input, the slide operation input, or both the operation inputs, and when the number of those operation inputs is plural (when the total number of touch operation inputs and slide operation inputs is plural), represents a total size of areas of spots touched by the respective operation inputs.

In addition, the "moving speed of a display region part of content exhibited in the scroll display process" represents the size of the area of the size of the area of a non-display region part of the content to be displayed on the screen per unit time period (or an area amount by which a display region part of the content being displayed on the screen is to be switched to a non-display region part) based on the slide operation input.

(2) In the above terminal device, the input state detector may detect, as the input state, at least one of a slide operation direction or a slide operation amount exhibited in the slide operation input.

With this configuration, for example, when the scrolling speed or the scroll movement amount is to be controlled based on the number of slide operation inputs, the above embodiment enables to control the scrolling speed or the scroll movement amount by referring to the slide operation direction (direction component of the corresponding direction in a case where the slide operation direction of the content is determined) and the slide operation amount together with the number of slide operation inputs.

For example, when the scrolling speed or the scroll movement amount is to be controlled based on the touch area of the slide operation input while the touch areas exhibited in a plurality of slide operation inputs are summed up, the above embodiment enables to control the scrolling speed or the scroll movement amount by referring to the same slide operation direction (including the component of the same slide operation direction) and the slide operation amount together with the touch area.

Therefore, even when an operation is performed through use of the touch panel with which it is difficult to perform various operations, the above embodiment enables to control various operations for the scrolling speed, the scroll movement amount, or the like by a simple operation.

(3) In the above terminal device, the input state detector may detect a characteristic exhibited by a non-display region part of the content, and the display controller may control the scrolling speed or the scroll movement amount during the slide operation input based on the characteristic of the non-display region part of the content together with the number of slide operation inputs or a touch area of a region touched on the screen.

With this configuration, during the slide operation input, the scrolling speed can be further controlled based on the characteristic of the non-display region part of the content, and hence the scrolling speed or a scroll amount can be controlled, for example, based on a characteristic (i.e., a characteristic of an extent) of a region size of the non-display region part of the content or based on a characteristic of an object formed to be displayed, which includes the number of characters formed for use in the game so as to be displayable in the non-display region part of the content or the type of the character.

Therefore, the above embodiment enables to appropriately control the scrolling while alleviating the processing load based on the characteristic of how the non-display part of the content is being displayed or being formed, and to improve convenience in slide operation input, which can improve operability in operation input using the touch panel.

(4) In the above terminal device, the input state detector may detect a characteristic exhibited by a non-display region part of the content, and the display controller may display the content relating to the game on the screen based on the detected characteristic.

With this configuration, the content relating to the game can be displayed on the screen based on the characteristic exhibited by the non-display region part of the content including the extent of the region size of the non-display region part of the content, the number of characters arranged in the non-display region part of the content for use in the game, or the type of the character, and hence it is possible to allow the player to easily recognize the characteristic exhibited by the non-display region part of the content by, for example, displaying the entire content in red when the number of characters arranged in the non-display region part of the content for use in the game is large and displaying the entire content in blue when the number of characters is small.

(5) In the above terminal device, the characteristic of the non-display region part of the content may include at least one characteristic of an extent of a region size of the non-display region part of the content, a number of characters arranged in the non-display region part of the content for use in the game, a type of the character, and an occupancy rate of an object arranged in the non-display region part of the content with respect to the non-display region part.

With this configuration, during the slide operation input, the scrolling speed can be further controlled based on the region size of the non-display region part of the content, the number of characters arranged in the non-display region part of the content for use in the game, the type of the character, or an occupancy rate of the object arranged in the non-display region part of the content with respect to the non-display region part.

For example, the above embodiment enables to reduce the scrolling speed or the scroll movement amount when the region size of the non-display region part of the content is small, and to increase the scrolling speed or the scroll movement amount when the region size of the non-display region part of the content is large.

Specifically, when the region size of the non-display region part of the content is small, a displayable region part is small even with the increased scrolling speed or scroll amount, and there is no change in content to be displayed even with the reduced scrolling speed or scroll amount. Therefore, it is possible to alleviate the processing load on a program in a case where there is no effect or the effect is small in the scroll display process.

According to the above embodiment, the scrolling speed or the scroll movement amount can be changed based on the number of enemy characters or other such predetermined characters arranged in the non-display region part of the content for use in the game, the arrangement of a boss character or other such special character, or the occupancy rate of the enemy character or other such object arranged in the non-display region part of the content with respect to the non-display region part.

Therefore, the above embodiment enables to appropriately control the scrolling while alleviating the processing load based on how the content is being displayed or being formed, and to improve convenience in slide operation input, which can improve operability in operation input using the touch panel.

(6) In the above terminal device, the computer may further be caused to function as a notification controller that executes a notification control process for notifying the scrolling speed or the scroll movement amount on the screen under the scroll display process.

With this configuration, for example, an indication for visually recognizing a status of the changing scrolling speed or the changing scroll movement amount exhibited in the scroll display process or a sound for notifying the status of the scrolling speed or the scroll movement amount is output, to thereby allow an operator to recognize the status of the scrolling speed or the scroll movement amount, and hence it is possible to perform an accurate slide operation input.

DESCRIPTION OF EMBODIMENTS

Exemplary embodiments of the invention are described below. Note that the following exemplary embodiments do not unduly limit the scope of the invention as stated in the claims. Note also that all of the elements described below should not necessarily be taken as essential elements of the invention.

1. Game System

An outline and a schematic configuration of a game system 1 according to one embodiment of the invention are described below with reference to FIG. 1. Note that FIG. 1 is a diagram for illustrating an example of the system configuration of the game system 1.

Figure 1:
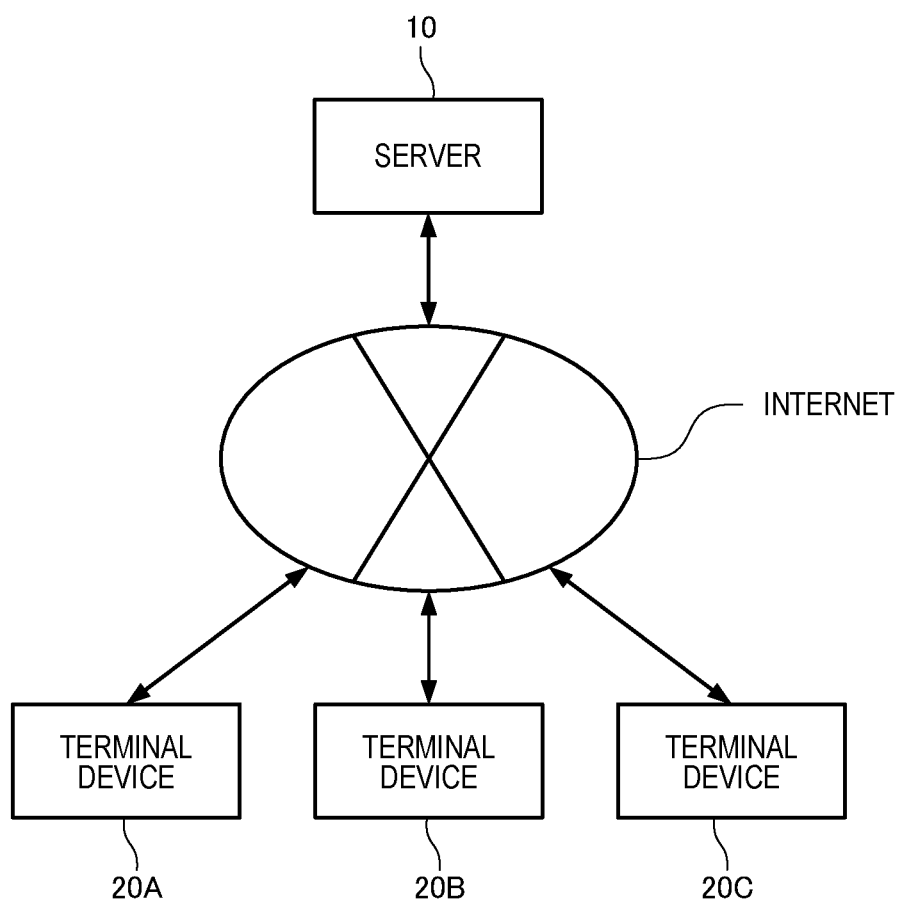
FIG. 1 is a diagram for illustrating an example of a system configuration representing a configuration of a game system according to one embodiment of the invention.

As illustrated in FIG. 1, the game system 1 includes a server 10 that provides a game service and a terminal device 20 (e.g., terminal devices 20A, 20B, and 20C), and the server 10 and the terminal device 20 can be connected to the Internet (i.e., network).

The user can play the game that is transmitted from the server 10 through the Internet by accessing the server 10 from the terminal device 20. The user can communicate with another user by accessing the server 10 from the terminal device 20.

The server 10 is an information processing device that can provide a service that allows the user to play the game using the terminal device 20 that is communicably connected to the server 10 through the Internet. The server 10 may also function as an SNS server that provides a communication-type service. The SNS server may be an information processing device that provides a service that allows a plurality of users to communicate with each other.

For example, when the server 10 functions as the SNS server, the server 10 can provide a game that is referred to as a social game that is implemented by utilizing the operating environment (e.g., application programming interface (API) or platform) provided by the SNS.

The server 10 can provide a game that is provided on a web browser that runs on the terminal device 20 (e.g., a browser game (i.e., a game that starts when the user has opened the game website using the web browser) written in an arbitrary language (e.g., HTML, FLASH, CGI, PHP, shockwave, Java (registered trademark) applet, or JavaScript (registered trademark))).

Note that the term "social game" used herein includes a game that does not require dedicated client software (differing from existing online games), and can be played using only a web browser and an SNS account. The server 10 can provide an online game that is designed so that each terminal connects to a terminal (e.g., smartphone, personal computer, or game device) of another user through a network, and the terminals share the game online.

The server 10 may include a single device or processor, or may include a plurality of devices or processors.

Information (e.g., charge information and game information) that is stored in a storage area (storage section 140 described later) of the server 10 may be stored in a database (storage device or memory in a broad sense) that is connected through a network (intranet or Internet). When the server 10 functions as the SNS server, information (e.g., user information 146) stored in the storage area may be stored in a database (storage device or memory in a broad sense) that is connected through a network (intranet or Internet).

More specifically, the server 10 receives input information based on an operation performed by the user (i.e., the player who plays the game) of the terminal device 20, and performs a game process based on the received input information. The server 10 transmits the game processing results to the terminal device 20, and the terminal device 20 performs various processes for providing the game processing results received from the server 10 to the user so that the user can view the game processing results.

The terminal device 20 is an information processing device such as a smartphone, a mobile phone, a PHS, a computer, a game device, a PDA, a portable game machine, or an image generation device, and can connect to the server 10 through a network (e.g., Internet (WAN) and LAN). Note that the terminal device 20 and the server 10 may be connected through a cable communication channel, or may be connected through a wireless communication channel.

The terminal device 20 is provided with a web browser that allows the user to browse a web page (HTML format data). Specifically, the terminal device 20 has a communication control function for communicating with the server 10, a web browser function for displaying an image using data (e.g., web data or HTML data) received from the server 10, and transmitting user operation data to the server 10, and the like. The terminal device 20 performs various processes that provide a game screen to the user, and allows the user to play the game. Note that the terminal device 20 may acquire game control information from the server 10, and perform a predetermined game process to implement a game based on the game process.

Specifically, when the terminal device 20 has transmitted a predetermined game play request to the server 10, the terminal device 20 is connected to the game website provided by the server 10, and the game starts. The terminal device 20 causes the server 10 that functions as an SNS server to perform a predetermined process, or acquire user information 146 that is managed by the server 10 that functions as an SNS server optionally using an API, and implements the game.

2. Server

Figure 2:
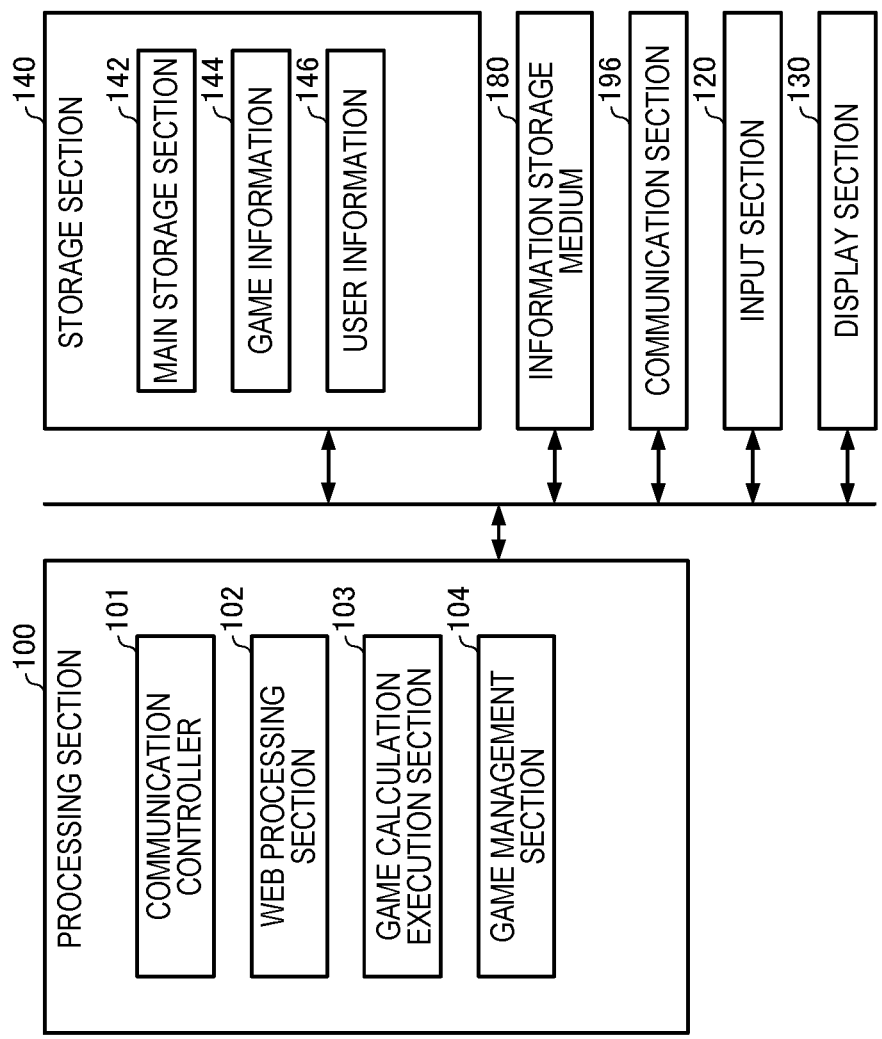
FIG. 2 is an example of a functional block diagram for illustrating a configuration of a server according to one embodiment of the invention.

The server 10 is described below with reference to FIG. 2. Note that FIG. 2 is a diagram for illustrating the functional blocks of the server 10. The server 10 may have a configuration in which some of the elements (sections) illustrated in FIG. 2 are omitted.

The server 10 includes an input section 120 that allows the administrator and the like to input information, a display section 130 that displays a predetermined screen, an information storage medium 180 that stores predetermined information, a communication section 196 that communicates with the terminal device 20 and the like, a processing section 100 that mainly performs a process for implementing the game that is provided by the server 10, and a storage section 140 that mainly stores various types of data used to implement the game.

The input section 120 allows the system administrator and the like to input game settings, other necessary settings, and data. For example, the input section 120 is implemented by a mouse, a keyboard, or the like.

The display section 130 displays an operation screen for the system administrator. For example, the display section 130 is implemented by a liquid crystal display or the like.

The information storage medium 180 (computer-readable medium) stores a program, data, and the like. The function of the information storage medium 180 is implemented by an optical disk (CD or DVD), a magneto-optical disk (MO), a magnetic disk, a hard disk, a magnetic tape, a memory (ROM), or the like.

The communication section 196 performs a control process for communicating with the outside (e.g., terminal, another server, or another network system). The function of the communication section 196 is implemented by hardware such as a processor or a communication ASIC, a program, or the like.

The storage section 140 serves as a work area for the processing section 100, the communication section 196, and the like. The function of the storage section 140 is implemented by a RAM (VRAM) or the like. Note that the information stored in the storage section 140 may be managed using a database.

In this embodiment, the storage section 140 stores game information 144 that represents information about the game that is provided by the server 10, the user information 146 that represents information about the user (player) who plays the game that is provided by the server 10, and various types of information necessary for the game calculation process.

The processing section 100 performs various processes using a main storage section 142 included in the storage section 140 as a work area. The function of the processing section 100 may be implemented by hardware such as a processor (e.g., CPU or DSP) or an ASIC (e.g., gate array), or a program.

The processing section 100 performs various processes of the embodiment based on a program (data) stored in the information storage medium 180. Specifically, a program for causing a computer to function as each section of the embodiment (i.e., a program for causing a computer to execute the process of each section) is stored in the information storage medium 180.

For example, the processing section 100 (processor) performs various processes such as a process for controlling the entire server 10 and a process for controlling data transfer between each section based on the program stored in the information storage medium. The processing section 100 also performs a process for providing various services in response to a request from the terminal device 20.

More specifically, the processing section 100 includes at least a communication controller 101, a web processing section 102, and a game management section 104.

The communication controller 101 performs a process for exchanging data with the terminal device 20 through a network. Specifically, the server 10 performs various processes based on information received from the terminal device 20 and the like through the communication controller 101.

The communication controller 101 performs a process for transmitting a game screen to the terminal device 20 of the user based on a request from the terminal device 20 of the user.

The web processing section 102 functions as a web server. For example, the web processing section 102 performs a process for transmitting data in response to a request from the web browser installed on the terminal device 20 through a communication protocol such as Hypertext Transfer Protocol (HTTP), and performs a process for receiving data transmitted by the web browser installed on the terminal device 20.

Although an example in which the server 10 also functions as the SNS server is described below, the server 10 may be implemented by a game server and an SNS server that are provided separately. Part or the entirety of the game process may be implemented by the server 10, or part of the game process may be implemented by the terminal device 20.

The game management section 104 performs the game process for implementing a role-playing game (RPG) or a battle game that is played by each player in cooperation with the terminal device 20 based on operation information about the player that has been input through the terminal device 20, and manages the user information 146 (e.g., the progress of the game played by each user, item management, a character and various items used by each user).

Note that the game management section 104 may perform an automatic calculation process for automatically implementing the game based on various types of data set by the user without using an operation performed by the user to generate data for the terminal device 20 to replay the game, and transmitting the generated data to the terminal device 20.

3. Terminal Device

Figure 3:
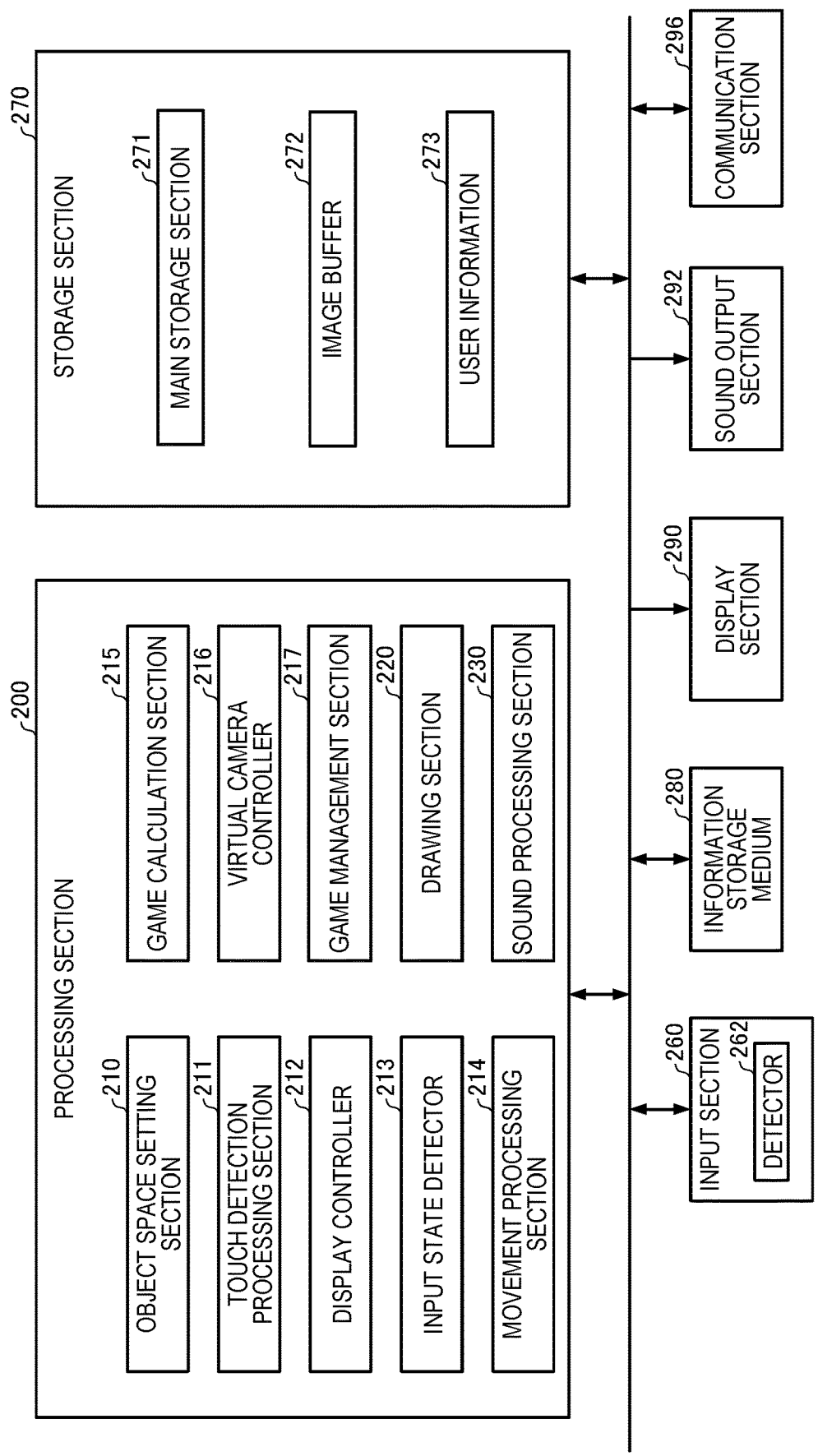
FIG. 3 is an example of a functional block diagram for illustrating a configuration of a terminal device according to one embodiment of the invention.
Figure 4A:
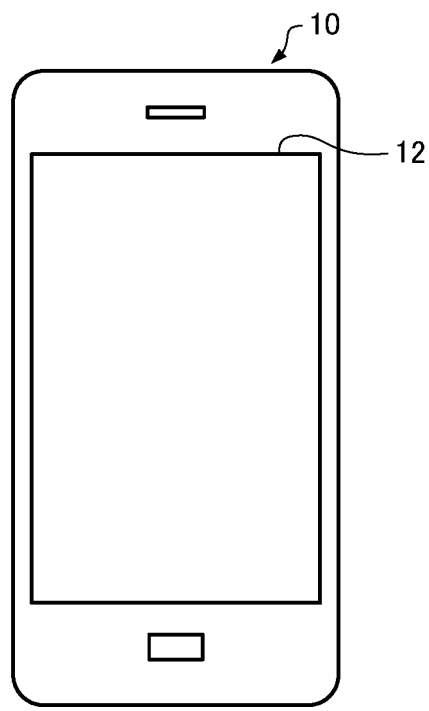
FIG. 4A is an example of a diagram for illustrating the external configuration of the terminal device according to one embodiment of the invention.
Figure 4B:
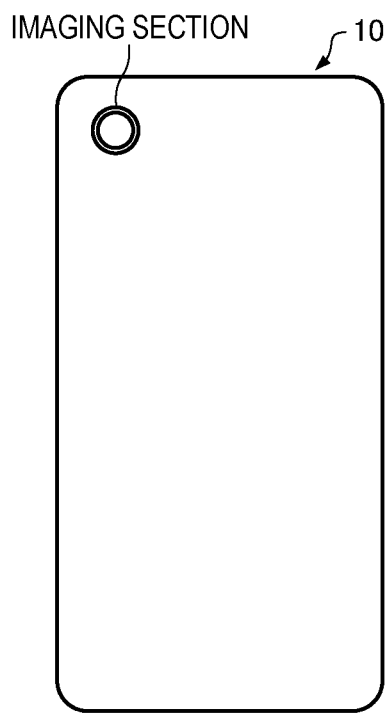
FIG. 4B is an example of a diagram for illustrating the external configuration of the terminal device according to one embodiment of the invention.

The terminal device 20 is described below with reference to FIG. 3, FIG. 4A, and FIG. 4B. Note that FIG. 3 is a functional block diagram for illustrating an example of the configuration of the terminal device 20, and FIG. 4A and FIG. 4B are diagrams for illustrating examples of the external configuration of the terminal device 20. Note that the terminal device 20 may have a configuration in which some of the elements (sections) illustrated in FIG. 3 are omitted.

An input section 260 allows the player to input operation data. The function of the input section 260 may be implemented by a touch panel, a touch panel display, or the like. The input section 260 includes a detector 262 that can detect two-dimensional indication position coordinates (x, y) within a screen on which an image is displayed. For example, the detector 262 can detect two-dimensional touch position coordinates (x, y) within a touch detection area (touch panel).

In this embodiment, the touch position is represented by position information obtained from the touch detection area due to a touch operation (including a direct touch operation and an indirect touch operation performed using a pointing device) performed by the player.

In this embodiment, the touch operation performed by the player may be a touch operation or a slide operation that is performed by the user directly on a touch panel 12 with a finger, a touch operation or a slide operation that is performed by the user indirectly on the touch panel 12 using a device such as a pointing device, or a pseudo-touch operation or a pseudo-slide operation that is performed on the touch panel 12.

For example, the term "pseudo-touch operation" or "pseudo-slide operation" used herein includes a touch operation or a slide operation that is detected when the user has touched or approximately touched the touch panel 12, such as (1) a touch operation or a slide operation that is determined based on coordinates when a light beam (e.g., infrared rays) is applied at a position close to the surface of the touch panel parallel to the surface of the touch panel, and the coordinates in the vertical direction and the horizontal direction at which the light beam is blocked when the user has touched or approximately touched the touch panel 12 are detected using a plurality of irradiation sections (that are formed on one side of the touch panel 12 in the vertical direction and the horizontal direction at a given interval) and a plurality of sensors (that make a pair with each irradiation section, are provided on the other side of the touch panel opposite to each irradiation section, and receive the applied light beam), and (2) a touch operation or a slide operation that is determined based on position coordinates when a camera that captures the display screen of the touch panel 12 is provided, and the position coordinates at which the user has touched or approximately touched the touch panel 12 are detected using the camera.

When a plurality of touch positions have been simultaneously detected within the touch detection area, one of the plurality of touch positions (e.g., the touch position that has been detected first) may be used, or the plurality of touch positions may be processed simultaneously.

When a plurality of determination areas are present within the touch detection area, one touch position (e.g., the touch position that has been detected first) may be used corresponding to each determination area. Note that the determination area refers to a range within the touch detection area in which the touch position that is processed by the processing section 200 (e.g., movement control process) is determined in advance.

In this embodiment, a display screen (display) 12 illustrated in FIG. 4A is implemented by a touch panel display in which a liquid crystal display and a touch panel that detects the touch position of the player (operator or user) are stacked. Specifically, the display screen 12 functions as the input section 260, and also functions as a display section 290.

Note that a touch operation on the display screen (hereinafter referred to as "touch panel" except for a special case) 12 may be performed with a fingertip, or may be performed using an input device (e.g., touch pen).

The input section 260 may include a button, a lever, a keyboard, a steering wheel, a microphone, an acceleration sensor, or the like that allows the player to input operation information (operation signal) other than the indication position.

A storage section 270 serves as a work area for a processing section 200, a communication section 296, and the like. The function of the storage section 270 may be implemented by a RAM (VRAM) or the like. The storage section 270 includes a main storage section 271 that is used as a work area, an image buffer 272 that stores the final display image and the like, user information 273 that represents information about the user (player) who plays the game that is provided by the server 10, and a game data storage section 274 that stores various types of data (e.g., table data) necessary for implementing the game. Note that the storage section 270 may have a configuration in which some of these sections (information) are omitted, or some of these sections (information) may be implemented by the storage section 140 of the server 10.

As described above, the main storage section 271 included in the storage section 270 may store a reference position and an indication position acquired by a touch detection processing section 211, various marker images, condition information that represents conditions used for various determination processes, and the like.

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like.

The information storage medium 280 can store a program for causing a computer to function as each section in this embodiment (i.e., a program for causing a computer to execute the process performed by each section). Note that the processing section 200 performs various processes in this embodiment based on the program (data) stored in the information storage medium 280 (as described later).

The display section 290 outputs an image generated in this embodiment. The function of the display section 290 may be implemented by a CRT, an LCD, a touch panel display, a head-mounted display (HMD), or the like.

Particularly, the display section 290 utilizes a touch panel display, and functions as the input section 260 through which the player performs a game operation. A resistive (4-wire or 5-wire) touch panel, a capacitive touch panel, an electromagnetic induction touch panel, an ultrasonic surface acoustic wave touch panel, an infrared scan touch panel, or the like may be used as the touch panel.

A sound output section 292 outputs sound generated in this embodiment. The function of the sound output section 292 may be implemented by a speaker, a headphone, or the like.

The communication section 296 performs various control processes for communicating with the outside (e.g., host device or another terminal device). The function of the communication section 296 may be implemented by hardware such as a processor or a communication ASIC, a program, or the like.

Note that the terminal device 20 may receive a program and data that are stored in the information storage medium or the storage section 270 included in the server 10 and cause a computer to function as each section in this embodiment through a network, and store the received program and data in the information storage medium 280 or the storage section 270. A case where the terminal device 20 receives a program and data, and operates based on the received program and data is also included within the scope of the invention.

The processing section 200 (processor) performs a game process, an image generation process, a sound generation process, and the like in cooperation with the server 10 based on data input from the input section 260, a program, and the like.

The game process includes a process for starting the game when game start conditions have been satisfied, a process for proceeding with the game, a process for disposing an object such as a player object or an enemy object, a process for displaying the object, a process for calculating the game results, a process for terminating the game when game termination conditions have been satisfied, and the like.

The processing section 200 performs various processes using the storage section 270 as a work area. The function of the processing section 200 may be implemented by hardware such as a processor (e.g., CPU or DSP) or an ASIC (e.g., gate array), or a program.

The processing section 200 includes an object space setting section 210, the touch detection processing section 211, a display controller 212, an input state detector 213, a movement processing section 214, a game calculation section 215, a virtual camera controller 216, a game management section 217, a drawing section 220, and a sound processing section 230. Note that the processing section 200 may have a configuration in which some of these sections are omitted.

For example, the touch detection processing section 211 serves as the input detector of the invention, and the display controller 212 serves as the display controller and the notification controller of the invention. For example, the input state detector 213 serves as the input state detector of the invention, and the sound processing section 230 of the invention serves as the notification controller of the invention.

The object space setting section 210 disposes (sets) an object (i.e., an object formed by a primitive surface such as a sprite, a billboard, a polygon, a free-form surface, or a subdivision surface) that represents a display object (e.g., object (player object, moving object, or enemy object), moving path, building, tree, pillar, wall, or map (geographical features)) in an object space.

More specifically, the object space setting section 210 determines the position and the rotation angle (synonymous with orientation or direction) of an object (model object), and disposes the object at the determined position ((X, Y) or (X, Y, Z)) and the determined rotation angle (rotation angles around X-axis and Y-axis or rotation angles around X-axis, Y-axis, and Z-axis).

The term "object space" used herein includes a virtual two-dimensional space and a virtual three-dimensional space. The two-dimensional space is a space in which the object is disposed at two-dimensional coordinates (X, Y), and the three-dimensional space is a space in which the object is disposed at three-dimensional coordinates (X, Y, Z), for example.

When the object space is a two-dimensional space, the object space setting section 210 disposes each object based on the priority set to each object. For example, the object space setting section 210 may perform a process for disposing each object in order from an object (sprite) that is desired be disposed on the deep side, and disposes an object that is desired to be disposed on the front side so as to overlap the object that has been disposed.

It is possible to generate an image in which an object space that corresponds to the upper side of the screen is disposed on the deep side, and an object space that corresponds to the lower side of the screen is disposed on the front side by disposing an object having a large drawing size on the lower side of the image, and disposing an object having a small drawing size on the upper side of the image.

When the object space is a three-dimensional space, the object space setting section 210 disposes the object in a world coordinate system.

The touch detection processing section 211 performs a determination process on input information that has been input by the player using the input section 260. More specifically, the touch detection processing section 211 acquires an indication position that has been input using the input section 260.

For example, the touch detection processing section 211 acquires a touch position (two-dimensional touch position coordinates) within the touch detection area (touch panel) that detects a touch operation performed by the player as the indication position.

Specifically, the touch detection processing section 211 acquires a touch position (indication position) within a touch operation period (slide operation period) that corresponds to a period in which the player touches the touch panel 12 with a finger (hereinafter referred to as "touch operation input"), and removes the finger from the touch panel 12 after moving the finger on the touch panel 12 (hereinafter referred to as "slide operation").

The touch detection processing section 211 performs (1) a first detection process for detecting a first change from a state in which a touch operation input on the screen is not performed (hereinafter referred to as "non-touch state") to a state in which a touch operation input is performed (hereinafter referred to as "touch state") (hereinafter referred to as "change in state"), and detects a detection position at which the change in state has occurred (hereinafter referred to as "reference position"), (2) a second detection process for detecting a second change that is a change in input using a slide operation (hereinafter referred to as "slide operation input") (i.e., indication position and change in indication position) when a slide operation input has been performed to directly follow the touch operation input performed when the first change was detected (when the change from the non-touch state to the touch state occurred), and (3) a third detection process for detecting a state in which a touch operation input on the screen is not performed during the slide operation input (i.e., change from the touch state to the non-touch state upon completion of the slide operation input).

The touch detection processing section 211 acquires the input indication position in a predetermined cycle. The predetermined cycle may be about $\frac{1}{60}$th of a second to about $\frac{1}{120}$th of a second (=one frame), for example.

In this embodiment, the terms "reference position" and "indication position" include a position on the touch panel 12 detected based on a touch operation input or a slide operation input, a position situated away from the detection position by a predetermined distance, and a predetermined position that is linked to a specific position on the touch panel 12, such as an area formed within a predetermined area (e.g., corner) of the touch panel 12.

The display controller 212 displays, on the touch panel 12, the content relating to the game executed based on an instruction issued by the player.

The "content" represents content formed to be displayable on the screen of the touch panel, which includes a game or a menu for performing a given setting relating to a game, and is formed of a "display region part of the content" being a part to be displayed on the screen and a part to be hidden outside the screen (hereinafter also referred to as "non-display region part of the content").

The display controller 212 controls a scroll display process for scrolling and moving the display region part of the content displayed on the screen based on the slide operation input.

Specifically, the display controller 212 controls a scrolling speed, which represents a moving speed exhibited when the display region part of the content is scrolled in the scroll display process, or a scroll movement amount, which represents a movement amount by which the content is scrolled, based on the input state detected by the input state detector 213 during the slide operation input.

The display controller 212 also controls the scrolling speed or the scroll movement amount, which is used when the scroll display process is executed, during the slide operation input based on the characteristic of the non-display region part of the content together with the number of slide operation inputs or the touch area of a region touched on the screen.

In particular, the display controller 212 controls the scrolling speed or the scroll movement amount, which is used when the scroll display process is executed, based on the characteristic of the non-display region part of the content, that is, at least one characteristic of the extent of the region size of the non-display region part of the content, the number of characters arranged in the non-display region part of the content for use in the game, or the type of the character.

The input state detector 213 detects, as the input state detected during the slide operation input, one of:

(A) the number of slide operation inputs being simultaneously executed; and (B) the touch area of a region touched on the screen to execute the slide operation input.

The input state detector 213 also detects at least one of the slide operation direction or the slide operation amount exhibited in the slide operation input. In particular, the input state detector 213 detects, as the slide operation amount, a length (touch length) exhibited by the continuous touching on the touch panel 12, and detects the slide operation direction based on a coordinate position and the previous coordinate position on the touch panel 12 for each predetermined time interval (for example, for each frame).

The movement processing section 214 calculates a movement of an object (in particular, character object, moving object, or other such operation target object) within an object space. Specifically, the movement processing section 214 performs a process for moving the moving object within the object space, or controls the motion (animation) of the moving object based on the input data input by the player using the input section 260, a program (movement algorithm), data (motion data), and the like.

More specifically, the movement processing section 214 performs a simulation process for sequentially calculating movement information (moving direction, moving amount, moving speed, position, rotation angle, or acceleration) and motion information (position or rotation angle of each part object) on the object every frame. Note that the term "frame" used herein refers to a time unit used when performing the object movement/motion process (simulation process) or the image generation process. The frame rate may be fixed, or may be changed corresponding to the processing load.

Note that the movement processing section 214 may perform a process for moving the object in a three-dimensional object space based on the input direction. For example, a moving direction is linked to each input direction in advance, and the movement processing section 214 moves the object in the moving direction that corresponds to the input direction.

The game calculation section 215 performs different kinds of game calculation processes. For example, when a plurality of player characters for use in the game are set as a deck based on an instruction issued by the player, the game calculation section 215 executes each of processes for causing the game to progress through use of the respective player characters set as the deck.

In particular, the game calculation section 215 performs a game calculation process necessary for forming an object space based on a map, proceeding the game based on a scenario set in advance based on an operation performed by the user, causing the player object (operation target object) to battle with the enemy object or another object (non-operation target object), and managing a parameter during the battle in a case of an RPG game.

The game calculation section 215 performs the process in cooperation with the server 10. Note that the game calculation section 215 may be partially or entirely implemented by the server 10.

The virtual camera controller 216 generates an image that is viewed from a given viewpoint and has a depth. In this case, the virtual camera controller 216 performs a process for controlling a virtual camera (viewpoint) for generating an image viewed from a given (arbitrary) viewpoint within the object space. Specifically, the virtual camera controller 216 performs a process for controlling the position (X, Y, Z) or the rotation angle (rotation angles around X-axis, Y-axis, and Z-axis) of the virtual camera (i.e., a process for controlling the viewpoint position or the line-of-sight direction).

For example, when imaging the object (e.g., character, ball, or car) from behind using the virtual camera, the virtual camera controller 216 controls the position or the rotation angle (orientation) of the virtual camera so that the virtual camera follows a change in the position or the rotation of the object.

In this case, the virtual camera controller 216 may control the virtual camera based on information about the position, the rotation angle, the speed, and the like of the object obtained by the game controller 214. Alternatively, the virtual camera controller 216 may rotate the virtual camera by a predetermined rotation angle, or may move the virtual camera along a predetermined path. In this case, the virtual camera controller 216 controls the virtual camera based on virtual camera data for identifying the position (moving path) or the rotation angle of the virtual camera.

When a plurality of virtual cameras (viewpoints) are provided, the virtual camera controller 216 performs the above control process corresponding to each virtual camera.

The game management section 217 sets the player character and various items used by each player in the game such as a battle game based on the operation input by the player using the input section 260, and registers the player character and the items in the user information 273.

When the game is implemented using a deck, the game management section 217 registers the player character and the items in the user information 273 as deck data.

The drawing section 220 performs a drawing process based on the results of various processes (game process) performed by the processing section 200 to generate an image, and outputs the generated image to the display section (display) 290. The drawing section 220 may generate a two-dimensional image, or may generate a three-dimensional image. The drawing section 220 generates an image that is viewed from the virtual camera within the object space, and is displayed within the screen.

When the drawing section 220 generates a two-dimensional image, the drawing section 220 draws each object in order from an object with the lowest priority, and draws an object with a higher priority over the object that has been drawn when an overlap occurs.

When the drawing section 220 generates a three-dimensional game image, the drawing section 220 receives object data (model data) including vertex data (e.g., vertex position coordinates, texture coordinates, color data, normal vector, or alpha-value) that represents each vertex of the object (model), and performs a vertex process based on the vertex data included in the input object data. The drawing section 220 may optionally perform a vertex generation process (tessellation, curved surface division, or polygon division) for subdividing the polygon when performing the vertex process.

When the drawing section 220 performs the vertex process, the drawing section 220 performs a vertex movement process and a geometric process (e.g., coordinate transformation (world coordinate transformation or camera coordinate transformation), clipping, perspective transformation, or light source process), and changes (updates or adjusts) the vertex data that represents each vertex that forms the object based on the processing results. The drawing section 220 performs a rasterization process (scan conversion process) based on the vertex data subjected to the vertex process to link the surface of the polygon (primitive) to pixels. The drawing section 220 then performs a pixel process (fragment process) for drawing the pixels that form the image (fragments that form the display screen).

When the drawing section 220 performs the pixel process, the drawing section 220 determines the final drawing color of each pixel by performing a texture reading (texture mapping) process, a color data setting/change process, a translucent blending process, an anti-aliasing process, and the like, and outputs (draws) the drawing color of the object subjected to perspective transformation to the image buffer 272 (i.e., a frame buffer or a buffer that can store image information on a pixel basis (VRAM or rendering target)). Specifically, the pixel process includes a per-pixel process for setting or changing the image information (e.g., color, normal, luminance, and alpha-value) on a pixel basis.

The drawing section 220 thus generates an image that is viewed from the virtual camera (given viewpoint) set within the object space. When a plurality of virtual cameras (viewpoints) are provided, the drawing section 220 may generate an image so that images (segmented images) viewed from the respective virtual cameras are displayed within one screen.

The vertex process and the pixel process performed by the drawing section 220 may be implemented by hardware that enables a programmable polygon (primitive) drawing process (i.e., programmable shader (vertex shader or pixel shader)) of a shader program written in shading language. The programmable shader enables a programmable per-vertex process and per-pixel process, increases the degree of freedom with respect to the drawing process, and significantly improves the representation capability as compared with a fixed hardware drawing process.

The drawing section 220 performs a geometric process, a texture mapping process, a hidden surface removal process, an alpha-blending process, and the like when drawing the object.

The geometric process includes subjecting the object to a coordinate transformation process, a clipping process, a perspective projection transformation process, a light source calculation process, and the like. The drawing section 220 stores the object data (e.g., object's vertex position coordinates, texture coordinates, color data (luminance data), normal vector, or alpha-value) after the geometric process (after perspective transformation) in the storage section 270.

The texture mapping process includes a process for mapping a texture (texel value) stored in a texture storage section included in the storage section 270 onto the object. Specifically, the drawing section 220 reads a texture (surface properties such as color (RGB) and alpha-value) from the texture storage section included in the storage section 270 using the texture coordinates set (assigned) to each vertex of the object and the like, and maps the texture (two-dimensional image) onto the object. In this case, the drawing section 220 performs a pixel-texel link process, a bilinear interpolation process (texel interpolation process), and the like.

Note that the drawing section 220 may perform a process for mapping a given texture onto the object when drawing the object. In this case, it is possible to dynamically change the color distribution (texel pattern) of the texture to be mapped onto the object.

In this case, a texture that has a different color distribution (pixel pattern) may be dynamically generated, or a plurality of textures that differ in color distribution may be provided in advance, and dynamically selected. The color distribution of the texture may be changed on an object basis.

The drawing section 220 performs the hidden surface removal process using a Z-buffer method (depth comparison method or Z-test) that utilizes a Z-buffer (depth buffer) that stores the Z-value (depth information) of the drawing target pixel. More specifically, the drawing section 220 refers to the Z-value stored in the Z-buffer when drawing the drawing target pixel that corresponds to the primitive of the object, and compares the Z-value stored in the Z-buffer with the Z-value of the drawing pixel of the primitive. When the Z-value of the drawing pixel is a Z-value (e.g., small Z-value) that indicates a position on the front side when viewed from the virtual camera, the drawing section 220 draws the drawing target pixel, and updates the Z-value stored in the Z-buffer with a new Z value.

When the drawing section 220 performs the alpha-blending process, the drawing section 220 performs a translucent blending process (e.g., normal alpha-blending process, additive alpha-blending process, or subtractive alpha-blending process) based on the alpha-value (A-value). Note that the alpha-value is information that can be stored so as to be linked to each pixel (texel or dot), such as additional information other than the color information. The alpha-value may be used as mask information, translucency (equivalent to transparency or opacity), bump information, or the like.

The drawing section 220 may generate an image that is displayed within a display area that corresponds to the touch detection area. The image that is displayed within the display area may be an image that includes the object, for example.

The sound processing section 230 performs a sound process based on the results of various processes performed by the processing section 200 to generate game sound (e.g., background music (BGM), effect sound, or voice), and outputs the generated game sound to the sound output section 292.

Note that the terminal device 20 may be a system dedicated to a single-player mode that allows only one player to play the game, or may be a system that also implements a multi-player mode that allows a plurality of players to play the game.

When a plurality of players play the game, the game image and the game sound provided to the plurality of players may be generated using one terminal device 20, or may be generated by a distributed process using a plurality of terminal devices 20 or the server 10 connected through a network (transmission line or communication line) or the like.

4. Method 4.1. Outline

An outline of the method (i.e., scroll display process) according to one embodiment of the invention is described below.

The terminal device 20 executes the game process for implementing a shooting game, a battle part of an RPG, a simulation game, and the like based on the touch operation input and the slide operation input.

That is, the terminal device 20 receives a touch operation input and a slide operation input that has been performed to directly follow the touch operation input, and controls the game process for implementing various games based on the touch operation input and the slide operation input that have been received.

In particular, (1) the terminal device 20 performs a first detection process for detecting a touch operation input that has been performed under a state in which no touch operation input is being performed on the touch panel 12, and performs a second detection process for detecting, as the slide operation input, an input involved in a slide operation that has been performed on the touch panel 12 to directly follow the touch operation input detected by the first detection process;

(2) the terminal device 20 displays the content relating to the game (for example, game content being executed by the player) on the touch panel 12, and controls the scroll display process for scrolling and moving the display region part of the content displayed on the touch panel 12 based on the slide operation input;

(3) the terminal device 20 detects, during the slide operation input, any one input state of (A) the number of slide operation inputs being simultaneously executed and (B) the touch area of a region touched on the touch panel 12 to execute the slide operation input; and (4) the terminal device 20 controls the scrolling speed, which represents the moving speed exhibited when the display region part of the content is scrolled in the scroll display process, or the scroll movement amount, which represents the movement amount by which the content is scrolled, during the slide operation input based on the detected input state.

The terminal device 20 also controls the scrolling speed or the scroll movement amount during the slide operation input based on the characteristic of the non-display region part of the content together with the number of slide operation inputs or the touch area of a region touched on the touch panel 12.

Note that the characteristic of the non-display region part of the content includes at least one characteristic of the extent of the region size of the non-display region part of the content, the number of characters arranged in the non-display region part of the content for use in the game, the type of the character, or the occupancy rate of the enemy character or other such object with respect to the non-display region part.

The terminal device 20 that is configured as described above can freely scroll the content being displayed and control the scrolling speed or the scroll movement amount, which are used when the game content is scrolled and displayed, during the slide operation input based on the number of slide operation inputs or the touch area exhibited when the slide operation input is performed.

For example, the terminal device 20 can:

(1) reduce the number of slide operation inputs or reduce the touch area exhibited when the slide operation input is performed in a case where the display region part of the game content is to be finely corrected; and (2) increase the number of slide operation inputs or the touch area exhibited when the slide operation input is performed in a case of quickly or greatly moving to the outside of the display region being displayed on the screen of the touch panel, quickly examining the situation of the outside of the display region, examining the situation of a region spaced far apart from the display region, or moving to the region.

Therefore, even when an operation is performed through use of the touch panel, the terminal device 20 can control various operations for the scrolling speed, the scroll movement amount, or the like by a simple operation, and hence it is possible to provide an attractive game while improving playability of the game using the touch panel.

4.2. Basic Principle of the Scroll Display Process

The basic principle of the scroll display process according to one embodiment of the invention is described below with reference to FIG. 5 to FIG. 16.

Figure 5:
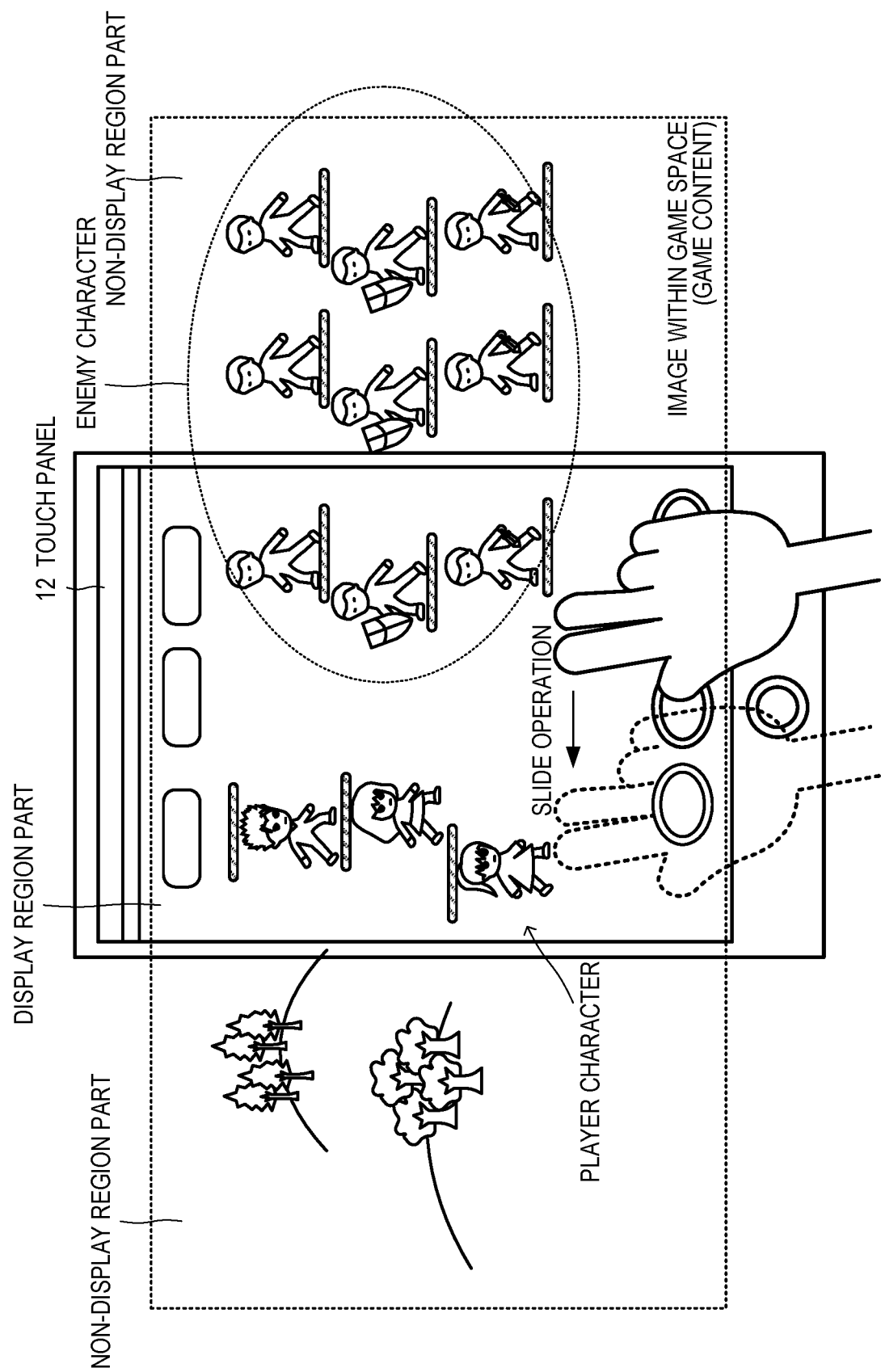
FIG. 5 is a diagram (part 1) for illustrating a scroll display process according to one embodiment of the invention.
Figure 6:
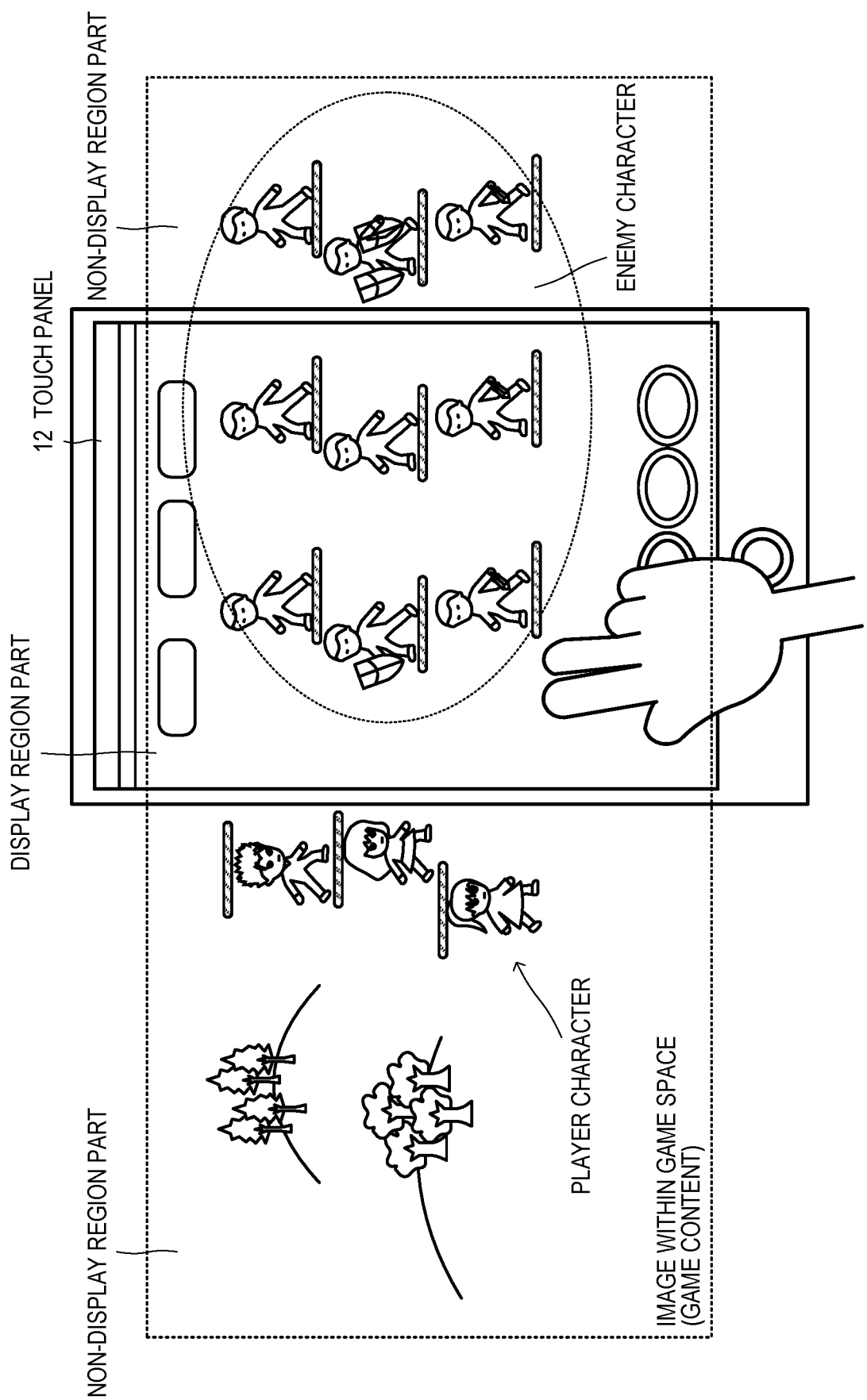
FIG. 6 is a diagram (part 2) for illustrating a scroll display process according to one embodiment of the invention.
Figure 7B:
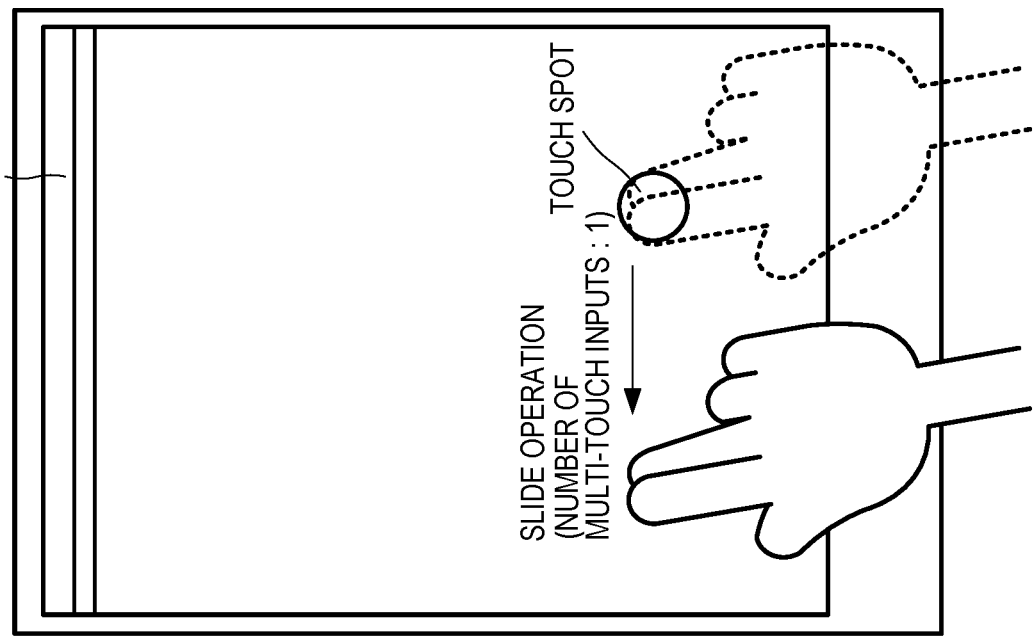
FIG. 7B is a diagram (part 2) for illustrating the detection of an input state of a slide operation input according to one embodiment of the invention.
Figure 7A:
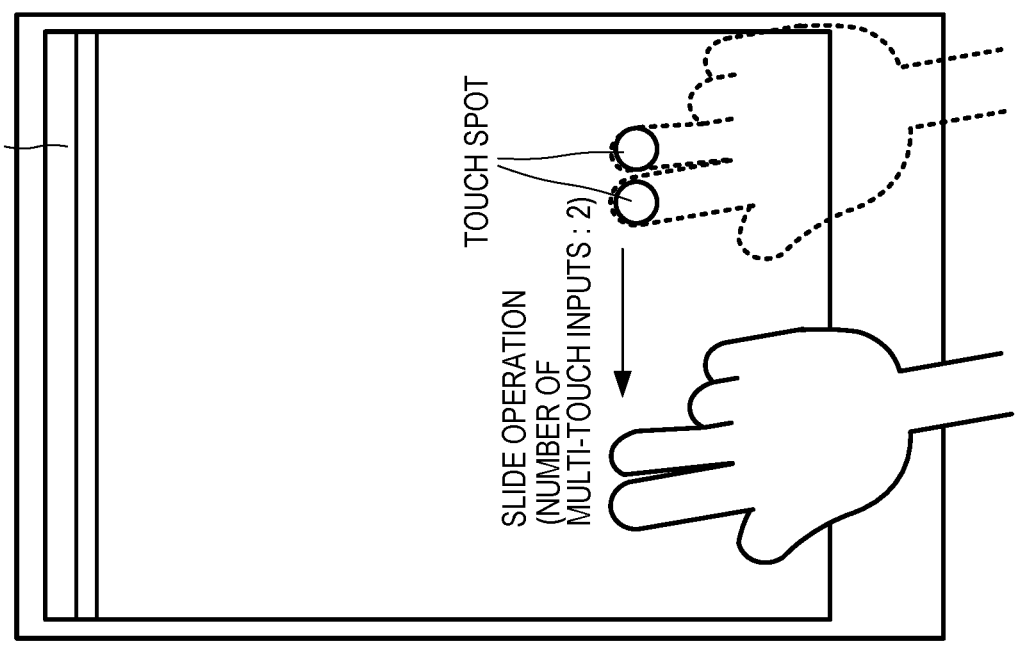
FIG. 7A is a diagram (part 1) for illustrating the detection of an input state of a slide operation input according to one embodiment of the invention.
Figure 8B:
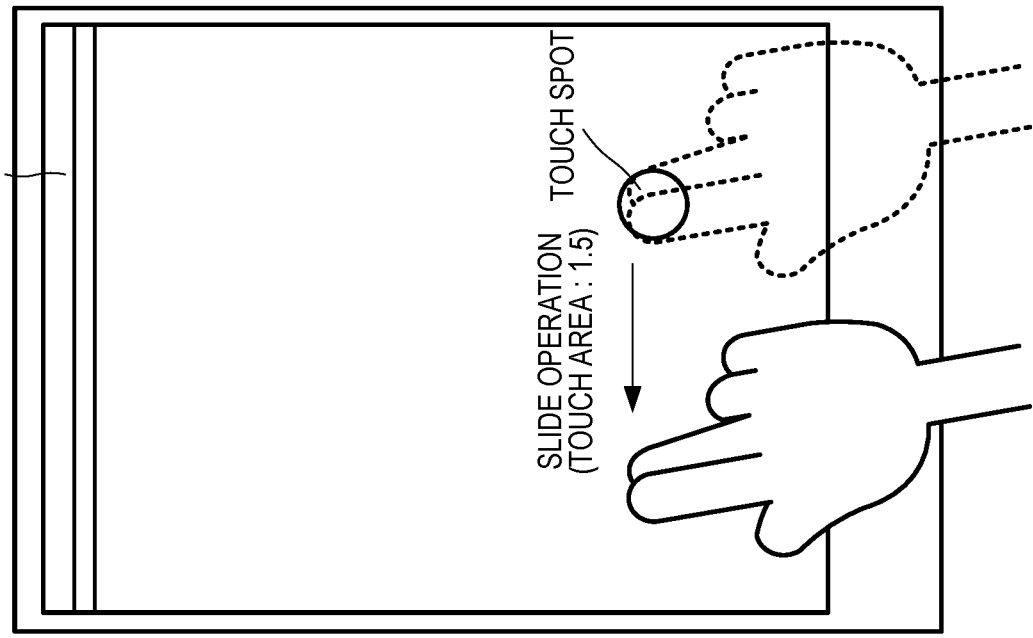
FIG. 8B is a diagram (part 4) for illustrating the detection of an input state of a slide operation input according to one embodiment of the invention.
Figure 9:
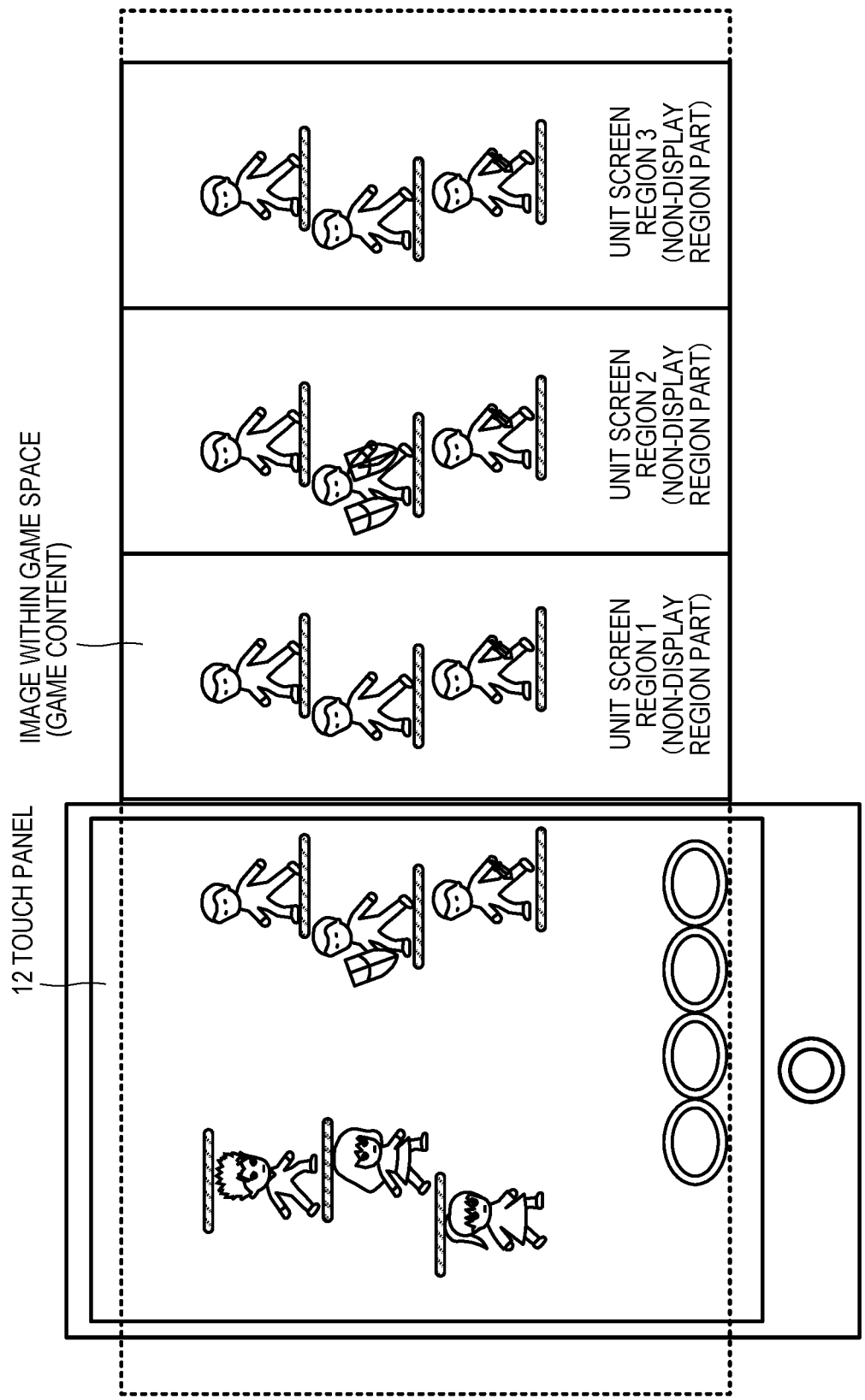
FIG. 9 is a diagram (part 1) for illustrating the scroll display process executed based on the input state (number of operation inputs) of the slide operation input according to one embodiment of the invention.
Figure 10:
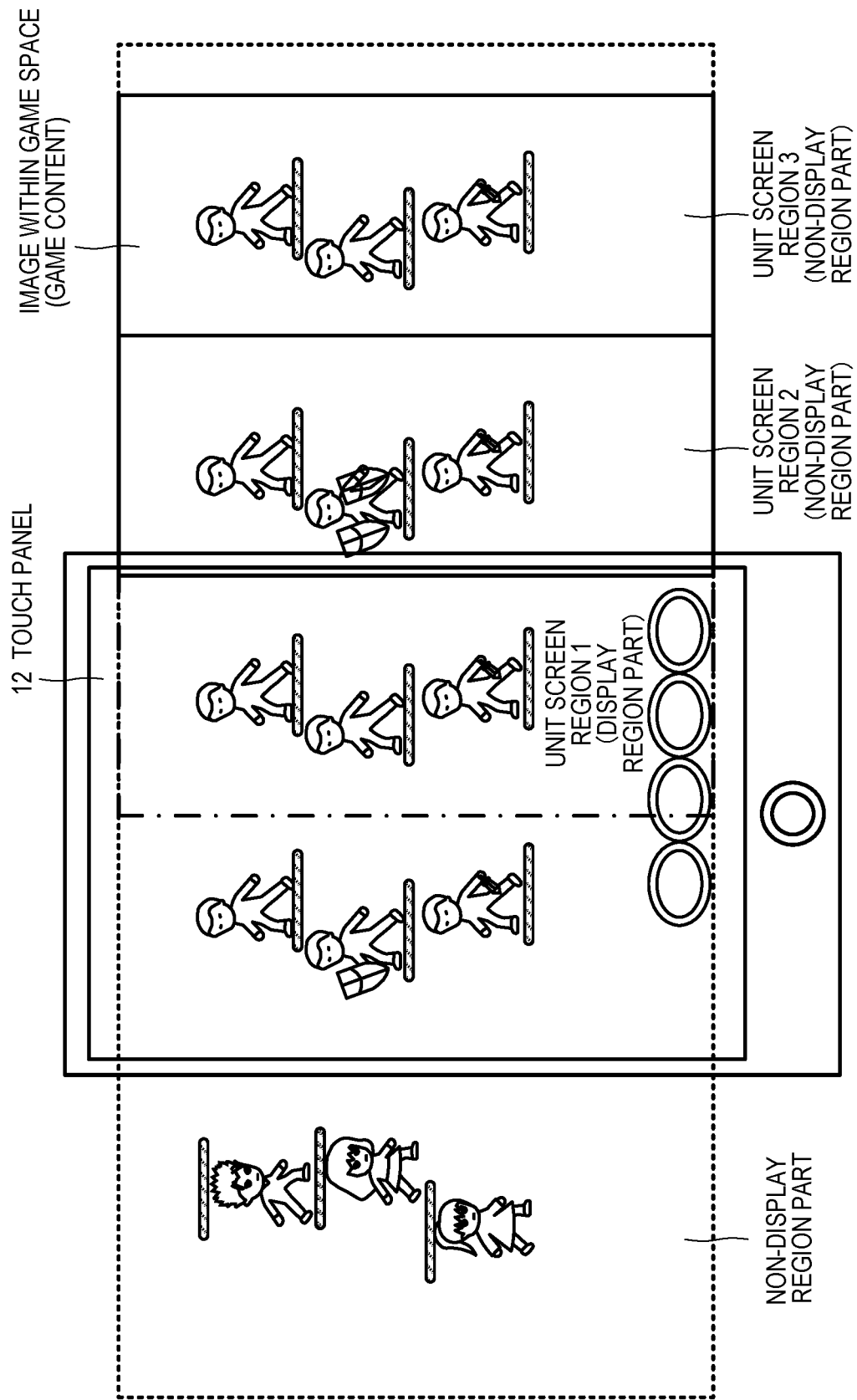
FIG. 10 is a diagram (part 2) for illustrating the scroll display process executed based on the input state (number of operation inputs) of the slide operation input according to one embodiment of the invention.
Figure 11:
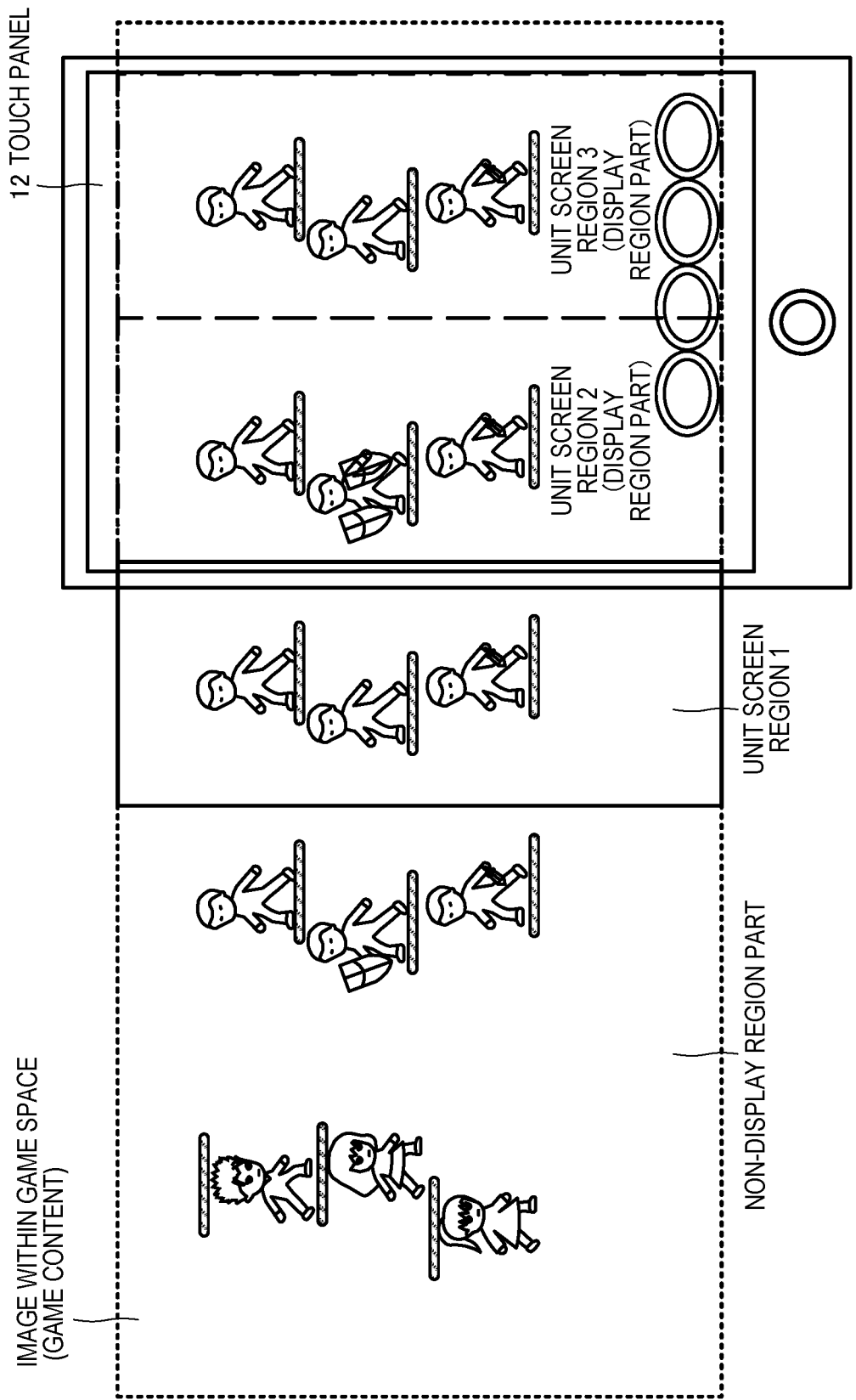
FIG. 11 is a diagram (part 3) for illustrating the scroll display process executed based on the input state (number of operation inputs) of the slide operation input according to one embodiment of the invention.
Figure 16:
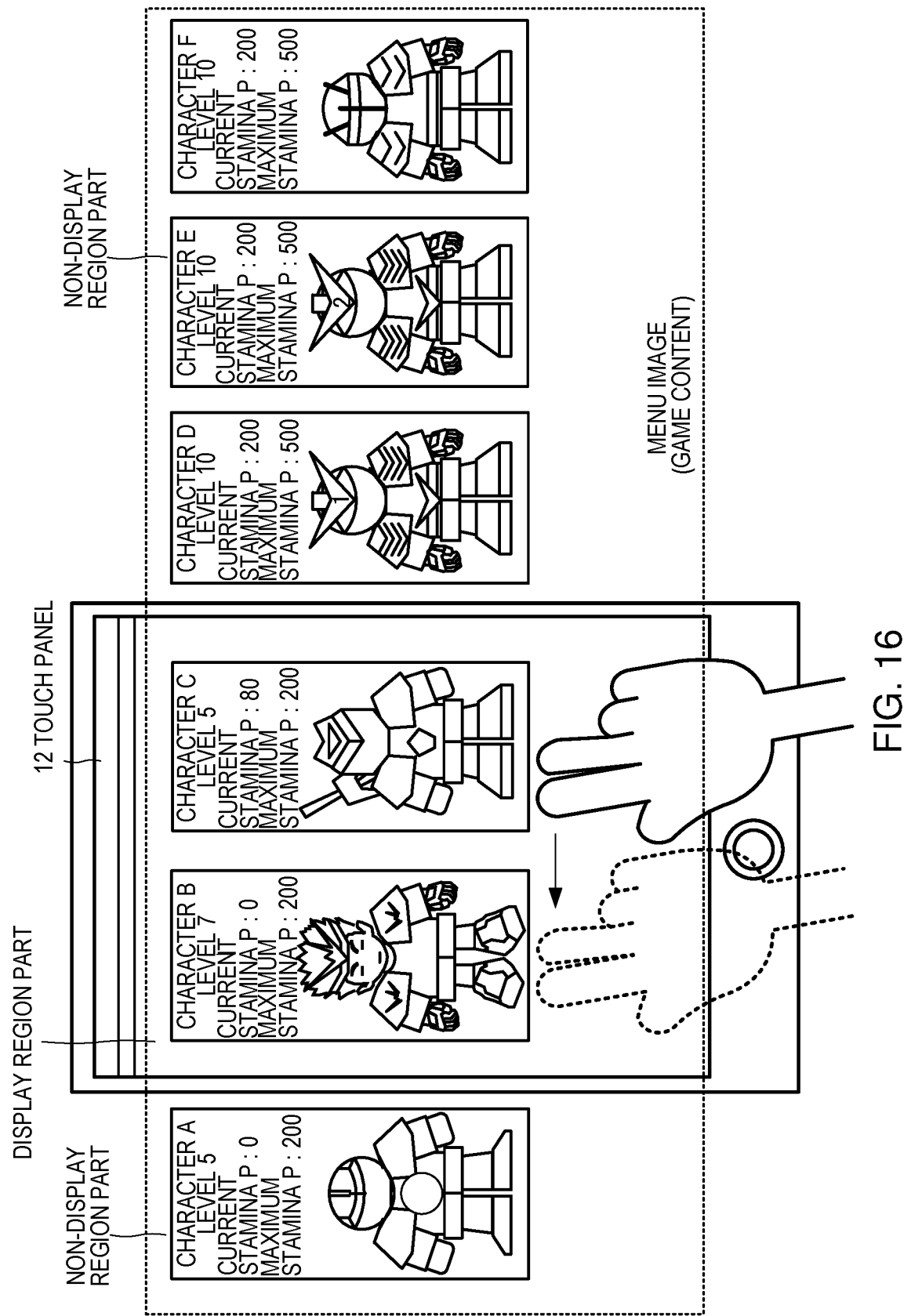
FIG. 16 is a diagram for illustrating another example of the scroll display process according to one embodiment of the invention.

Note that FIG. 5 and FIG. 6 are diagrams for illustrating the scroll display process, and FIG. 7A to FIG. 8B are diagrams for illustrating the detection of the input state of the slide operation input. FIG. 9 to FIG. 11 are diagrams for illustrating the scroll display process executed based on the input state (number of operation inputs) of the slide operation input, and FIG. 12 to FIG. 15 are diagrams for illustrating the scroll display process executed based on the characteristic of the non-display region part (region size of the non-display region part). FIG. 16 is a diagram for illustrating another example of the scroll display process.

<Scroll Display Process Based on Input State Detected During Slide Operation Input>

The display controller 212 displays the game content drawn by the drawing section 220 on the touch panel 12. The game content is obtained by forming: the image within the game space, in which different kinds of objects including the player object and the enemy object viewed from the virtual camera are arranged by the virtual camera controller 216; and different kinds of display objects to be displayed during the execution of the game, which include a game point, a hit point, and an operation command.

As exemplified in, for example, FIG. 5, the image within the game space is obtained by forming: the display region part displayed on the touch panel 12 (i.e., the display region part of the game content); and the non-display region part being a region that is hidden outside the touch panel 12 and is to be displayed on the touch panel 12 when controlled to be displayed based on an operation of the player or the progress of the game. Note that FIG. 5 is an illustration of the image of the game space which is formed in a left-right direction with respect to the drawing and in which the game content having the scroll display process limited to the left-right direction is formed.

The display controller 212 then executes display control for displaying only the display region part on the touch panel 12, and controls the scroll display process for scrolling and moving the display region part of the game content displayed on the touch panel 12 based on the slide operation input.

As exemplified in FIG. 5 and FIG. 6, as the scroll display process, the display controller 212 basically executes a display process for:

(1) moving a position in the display region of the content, at which a touch operation input has been detected, or a reference position, which is a position on the touch panel 12 relating thereto, toward the slide operation direction based on the slide operation input;

(2) displaying the non-display region part of the content formed in a direction reverse to the slide operation direction, which is determined based on an operation amount exhibited in the slide operation input (i.e., slide operation amount) and the input state exhibited in the slide operation input, on the touch panel 12 in association with the movement; and (3) switching the display region part of the content formed and displayed in the slide operation direction, which has moved to the outside of the region of the touch panel 12, to the non-display region part.

The input state detector 213 detects at least one of the slide operation direction or the slide operation amount (specifically, change amounts of an x-axis component and a y-axis component on the touch panel 12), which are exhibited in the slide operation input, as the input state during the slide operation input. However, for example, the input state detector 213 detects only the change amount of the x-axis component when, as illustrated in FIG. 5 and FIG. 6, there is a limitation on the scroll display process for the game space formed in the left-right direction with respect to the drawing.

The input state detector 213 then detects, during the slide operation input, any one input state of:

(A) the number of slide operation inputs (i.e., multi-touch inputs) being simultaneously executed; and (B) the touch area of a region touched on the touch panel 12 to execute the slide operation input (hereinafter referred to as "touch area").

In particular, as the number of slide operation inputs (i.e., multi-touch inputs) being simultaneously executed, the input state detector 213 detects the number of touch operation inputs (including slide operation inputs) that have been independently detected in the region on the touch panel 12 by the touch detection processing section 211.

For example, the input state detector 213 detects the number of slide operation inputs (hereinafter also referred to as "number of multi-touch inputs") as "2" when, as illustrated in FIG. 7A, the touch panel 12 is being touched on the surface by the player with his/her two fingers independently during the slide operation input. However, the input state detector 213 detects the number of slide operation inputs as "1" when, as illustrated in FIG. 7B, the touch panel 12 is being touched on the surface by the player with the two fingers in contact with each other (non-independently at one spot).

Meanwhile, the input state detector 213 detects, as the touch area, an area of a region being touched at a specific timing, for example, a timing of a specific frame when the touch operation input (including the slide operation input) detected by the touch detection processing section 211 is being executed in the region on the touch panel 12.

Figure 8A:
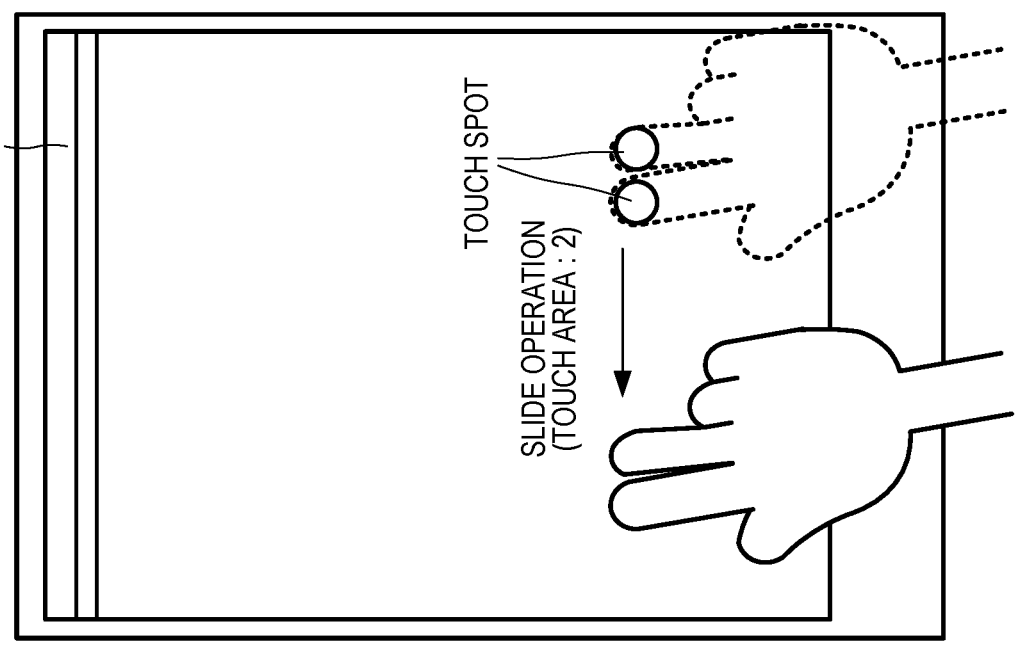
FIG. 8A is a diagram (part 3) for illustrating the detection of an input state of a slide operation input according to one embodiment of the invention.

For example, the input state detector 213 detects a total area of "2" as the touch area of two touch spots on the assumption that each touch area is "1" when, as illustrated in FIG. 8A, the touch panel 12 is being touched on the surface by the player with his/her two fingers independently during the slide operation input.

Further, for example, the input state detector 213 detects the area of a touch spot as the touch area (touch area being "1.5" in the case of FIG. 8B) exhibited during the slide operation input when, as illustrated in FIG. 8B, the touch panel 12 is being touched on the surface by the player with the two fingers in contact with each other (non-independently) during the slide operation input.

Note that when a plurality of slide operation inputs are detected (including when the touch area is detected), the slide operation amount involved in a specific one slide operation input, for example, the slide operation input based on the touch operation detected first, is used as the slide operation amount serving as a reference used for the scroll display process.

Meanwhile, the display controller 212 controls the scrolling speed or the scroll movement amount, which is exhibited in the scroll display process, during the slide operation input based on the number of slide operation inputs (number of multi-touch inputs) or the input state of the touch area exhibited in the slide operation input, which has been detected by the input state detector 213 as described above.

Specifically, in the scroll display process, the display controller 212:

(1) reduces the scrolling speed or the scroll movement amount when the number of slide operation inputs is small or the touch area exhibited when the slide operation input is performed is small; and (2) quickly or greatly moves the display region displayed on the touch panel 12 to the outside of the touch panel 12, quickly displays the non-display region, or displays the non-display region spaced far apart from the display region when the number of slide operation inputs is large or the touch area exhibited when the slide operation input is performed is large.

For example, it is assumed that the scroll display process for controlling the scroll movement amount based on the number of slide operation inputs is executed, and that the number of unit screen regions to be scrolled at a time of the scroll display process changes depending on the number of slide operation inputs. It is also assumed that the unit screen region having a predetermined slide operation amount of "1" is scrolled.

In this case, when, as illustrated in FIG. 9, (a1) the display region part of the game content is displayed on the touch panel 12, (a2) three unit screen regions are formed as the game content in the non-display region part, and (a3) the slide operation input having the number of slide operation inputs detected as being "1" unit is executed with a predetermined slide operation amount and a predetermined slide operation direction, the display controller 212 executes, as illustrated in FIG. 10, the scroll display process for scrolling the unit screen regions defined in advance by "1" screen at the time of the scroll display process to display a unit screen region 1 on the touch panel 12 as the display region part.

Meanwhile, in the same case as in (a1) and (a2) but when (b3) the same input slide operation input as in (a3) having the number of slide operation inputs detected as being "3" is executed with a predetermined slide operation amount and a predetermined slide direction, the display controller 212 executes, as illustrated in FIG. 11, the scroll display process for scrolling the unit screen regions defined in advance by "3" unit screens at the time of the scroll display process to display the display region part, mainly a unit screen region 3, on the touch panel 12. In particular, in FIG. 11, the unit screen regions 2 and 3 are displayed on the touch panel 12.

Note that, when the non-display region part of the content to be displayed by the slide operation input has not yet been formed to have a region size that enables the scrolling based on the number of slide operation inputs and the touch area, the scroll display process corresponding to a region size in which the non-display region part has already been formed is executed.

For example, in the same manner as described above with reference to FIG. 10 and FIG. 11, it is assumed that the scroll display process for controlling the scroll movement amount based on the number of slide operation inputs is executed, and that the number of unit screen regions to be scrolled at the time of the scroll display process changes depending on the number of slide operation inputs.

In this case, when the slide operation input having the number of slide operation inputs detected as being "3" is executed with a predetermined slide operation amount and a predetermined slide direction, and only the unit screen region corresponding to "1" unit screen has been formed, the display controller 212 executes the scroll display process for scrolling the unit screen regions defined in advance by "1" unit screen instead of "3" unit screens at the time of the scroll display process.

<Scroll Display Process Based on Characteristic of Non-Display Region Part of Content>

The display controller 212 executes the scroll display process for controlling the scrolling speed or the scroll movement amount based on the input state exhibited in the slide operation input detected by the input state detector 213, which includes the number of slide operation inputs or the touch area involved in the touching on the screen, and, or instead of the input state, the characteristic of the non-display region part of the game content including the display region part displayed on the touch panel 12.

Specifically, the display controller 212 executes the scroll display process for controlling the scrolling speed or the scroll movement amount based on the characteristic of an object formed to be displayed as the characteristic of the non-display region part of the content, the characteristic of the object formed to be displayed including:

(1) the characteristic of the region size (i.e., extent of the region size) of the non-display region part of the content;

(2) the number of characters (for example, enemy characters) for use in the game formed so as to be displayable in the non-display region part of the content;

(3) the type of the character (for example, a boss character of the enemy); or (4) the occupancy rate of the object (object for forming the enemy character, a battle, or a battlefield or other such object required for the progress of the game) arranged in the non-display region part of the content with respect to the non-display region part.

Figure 12:
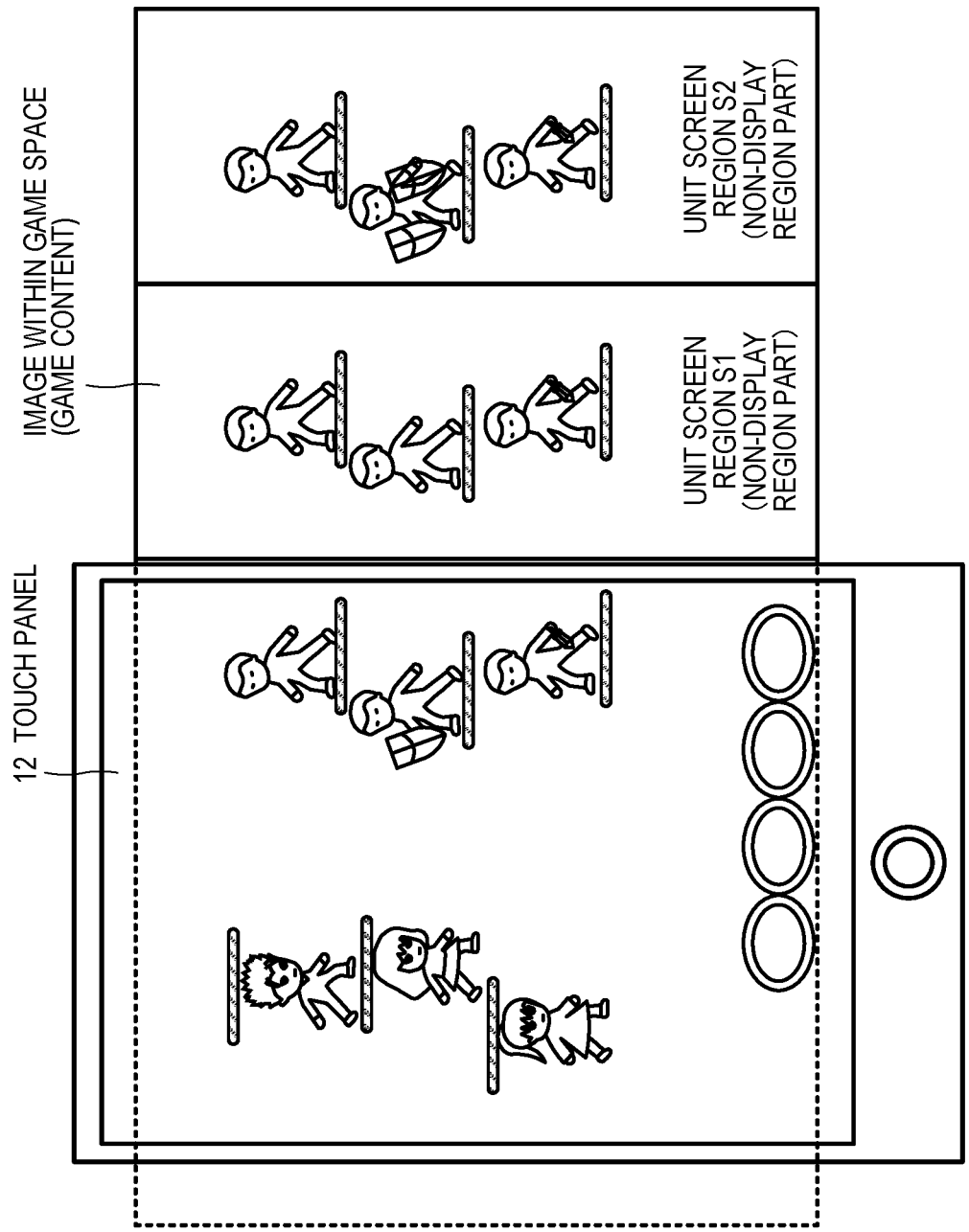
FIG. 12 is a diagram (part 1) for illustrating a scroll display process executed based on a characteristic of a non-display region part (region size of the non-display region part) according to one embodiment of the invention.
Figure 13:
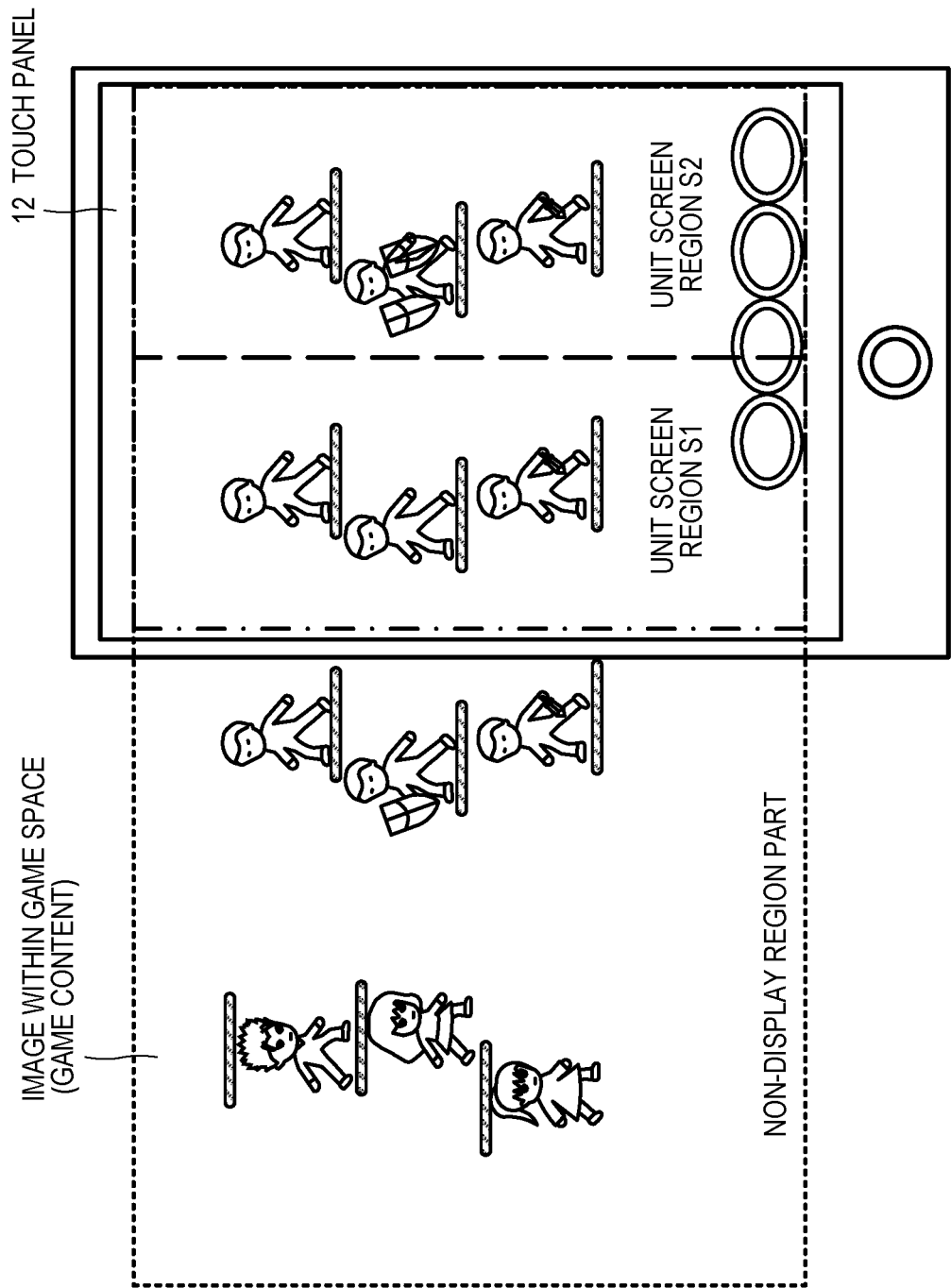
FIG. 13 is a diagram (part 2) for illustrating the scroll display process executed based on the characteristic of the non-display region part (region size of the non-display region part) according to one embodiment of the invention.

For example, in the case where the scroll movement amount is controlled based on the region size of the non-display region part of the content, when, as illustrated in FIG. 12, the game content is formed to include the non-display region part of "2" unit screens being the unit screen regions formed of unit screen regions S1 and S2, the display controller 212 displays, as illustrated in FIG. 13, the game content with the display unit screen region S2 as a reference on the touch panel 12 by scrolling and moving the game content by 2 unit screens based on the predetermined slide operation amount. In particular, in FIG. 13, the unit screen regions S1 and S2 are displayed on the touch panel 12.

Figure 14:
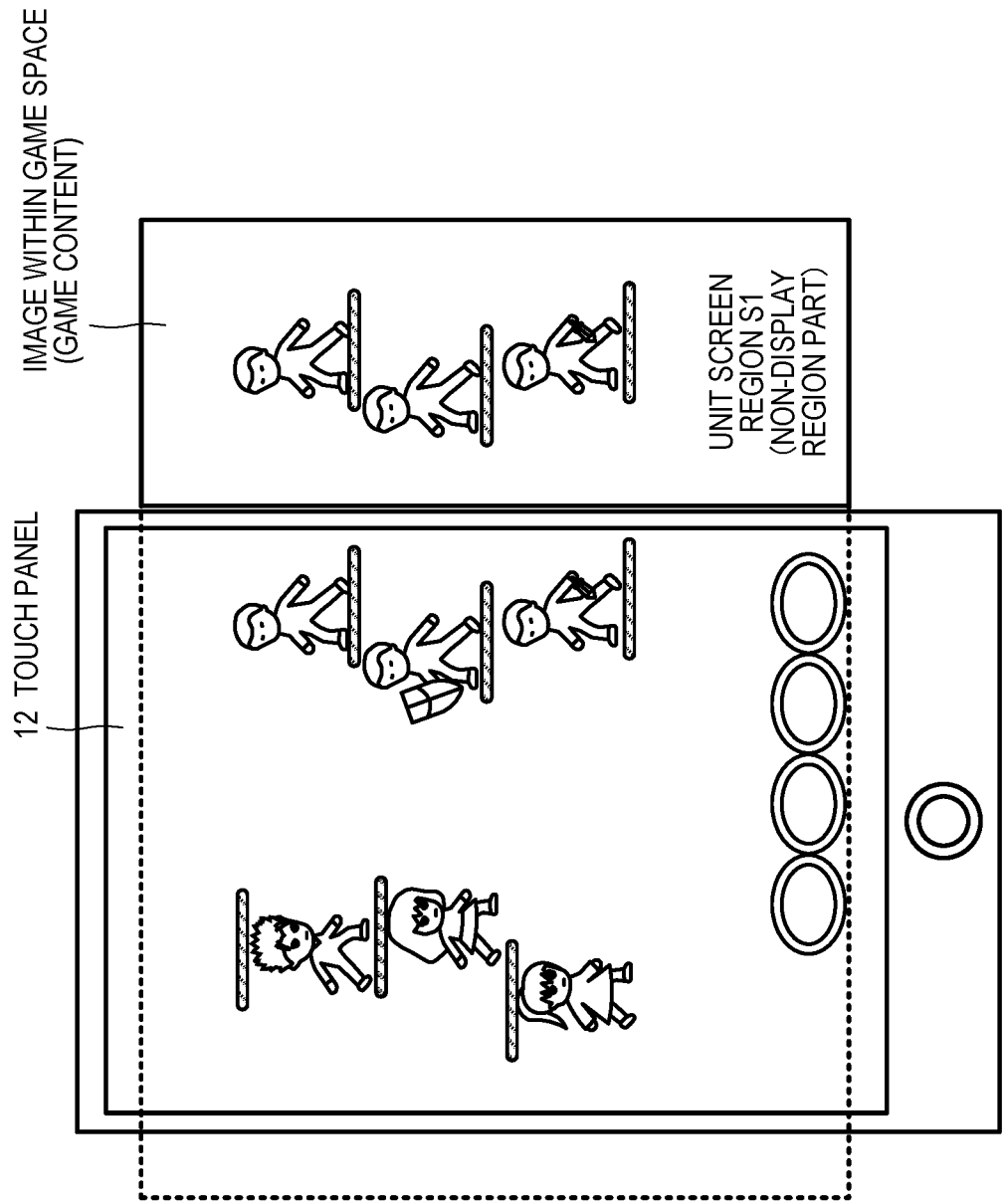
FIG. 14 is a diagram (part 3) for illustrating the scroll display process executed based on the characteristic of the non-display region part (region size of the non-display region part) according to one embodiment of the invention.
Figure 15:
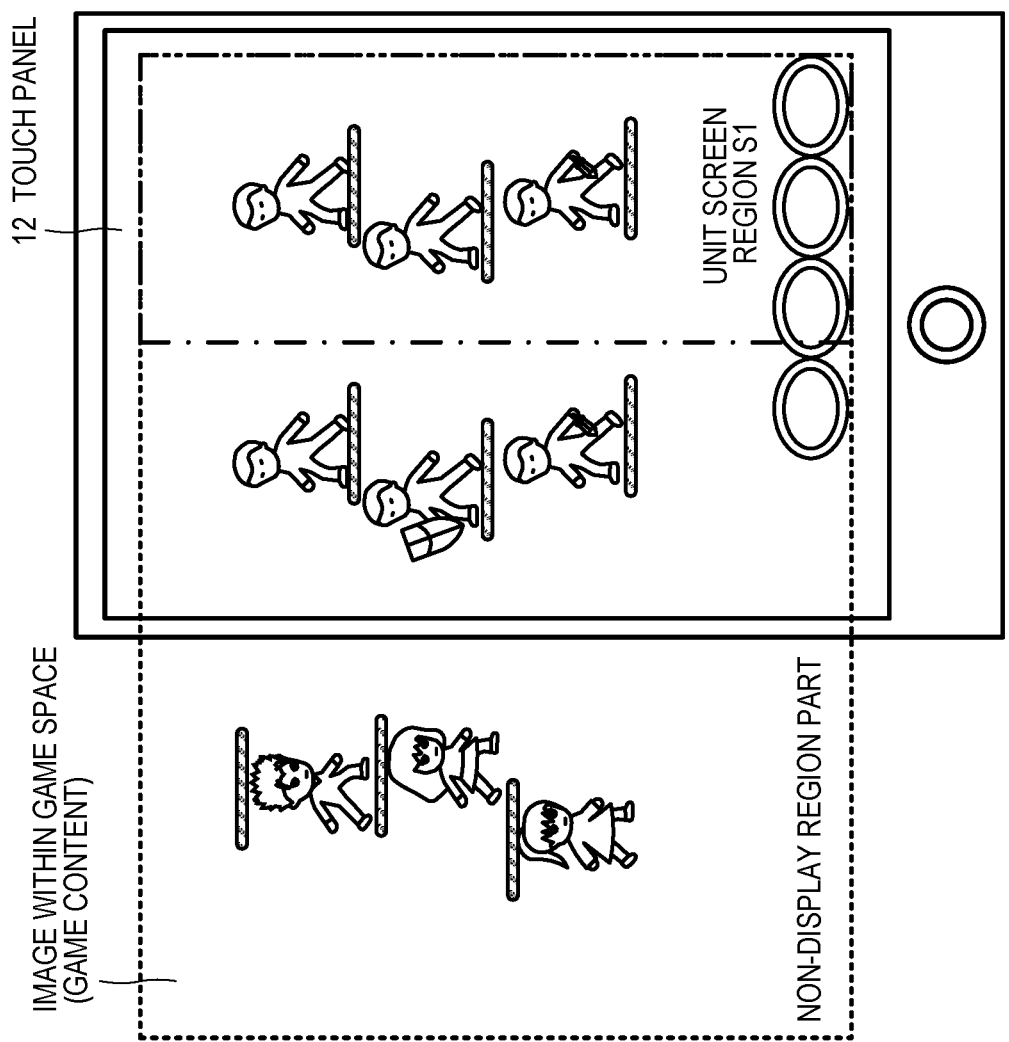
FIG. 15 is a diagram (part 4) for illustrating the scroll display process executed based on the characteristic of the non-display region part (region size of the non-display region part) according to one embodiment of the invention.

In the case where the scroll movement amount is controlled based on the region size of the non-display region part of the content, when, as illustrated in FIG. 14, the game content is formed to include the non-display region part of "1" unit screen formed of the display unit screen region S1 and the slide operation input is executed with the same slide operation amount and slide operation direction as those of the above example, the display controller 212 displays the game content with the display unit screen region S1 as a reference on the touch panel 12 by scrolling and moving the game content by 1 unit screen. In particular, in FIG. 15, the unit screen region S1 and a part of the region that was displayed before the scrolling are displayed on the touch panel 12.

Note that, for example, in the case where the scroll movement amount is controlled based on the number of enemy characters formed in the non-display region part of the content, when "3" enemy characters are detected in the non-display region, the display controller 212 determines a standard scrolling speed or a standard scroll movement amount, and executes the scroll display process based on the standard scrolling speed or the standard scroll movement amount that has been determined.

In such a case, when "9" enemy characters are detected in the non-display region, the display controller 212 determines a three-times higher scrolling speed or a three-times larger movement amount from the standard scrolling speed or the standard scroll movement amount, and executes the scroll display process based on the three-times higher scrolling speed or the three-times larger standard scroll movement amount that has been determined.

<Notification Control Process>

The display controller 212 may execute display control for displaying the scrolling speed or the scroll movement amount on the touch panel 12 under the scroll display process. For example, the display controller 212 executes displaying of an arrow formed toward the slide operation direction, and executes display control for indicating the scrolling speed or the scroll movement amount by the length of the arrow.

Note that, in this embodiment, a notification control process for notifying the scrolling speed or the scroll movement amount exhibited in the scroll display process by a sound effect output by the sound processing section 230 may be executed together with the above display control for displaying the scrolling speed or the scroll movement amount or instead of the display control.

Modification Example

In the above embodiments, the scroll display process executed by the display controller 212 is described through use of the game content for the execution of a battle game or other such game, but the scroll display process may be used when a menu for performing various settings for the game or the like is displayed to set or register a function desired by the user.

Such a case includes a case of selecting the player character for use in the battle game as illustrated in FIG. 16, and the display controller 212 displays player characters that can be selected by the player in the display region part, and forms the player characters in the non-display region part in a selectable manner.

Note that the number of multi-touch inputs is "2" in the case of FIG. 16. Therefore, assuming that the display region is scrolled by a predetermined slide operation amount one time for each player character, when the display region is scrolled by the predetermined slide operation amount two times while the slide operation is performed from the right to the left when facing the drawing, characters D and E are displayed in the display region part.

On the above assumption with the number of multi-touch inputs being replaced by "3", when the display region is scrolled by the predetermined slide operation amount three times while the slide operation is performed from the right to the left when facing the drawing, characters E and F are displayed in the display region part.

The scrolling speed determined in the scroll display process may be a constant acceleration or other such scrolling speed varied with time instead of a constant speed.

The display controller 212 may also change and display the display region part on the touch panel 12 by changing the display region part based on the characteristic exhibited by the non-display region part of the content, which includes the extent of the region size of the non-display region part of the content, the number of characters (for example, enemy characters) arranged in the non-display region part of the content for use in the game, the type of the character (for example, boss character), or the occupancy rate of the enemy character or other such object arranged in the non-display region part of the content with respect to the non-display region part.

For example, in this case, the display controller 212 displays the entire content in red when the number of characters arranged in the non-display region part of the content for use in the game is large, and displays the entire content in blue when the number of characters is small.

Note that the above configuration allows the player to easily recognize the characteristic exhibited by the non-display region part of the content.

5. Operation

Figure 17:
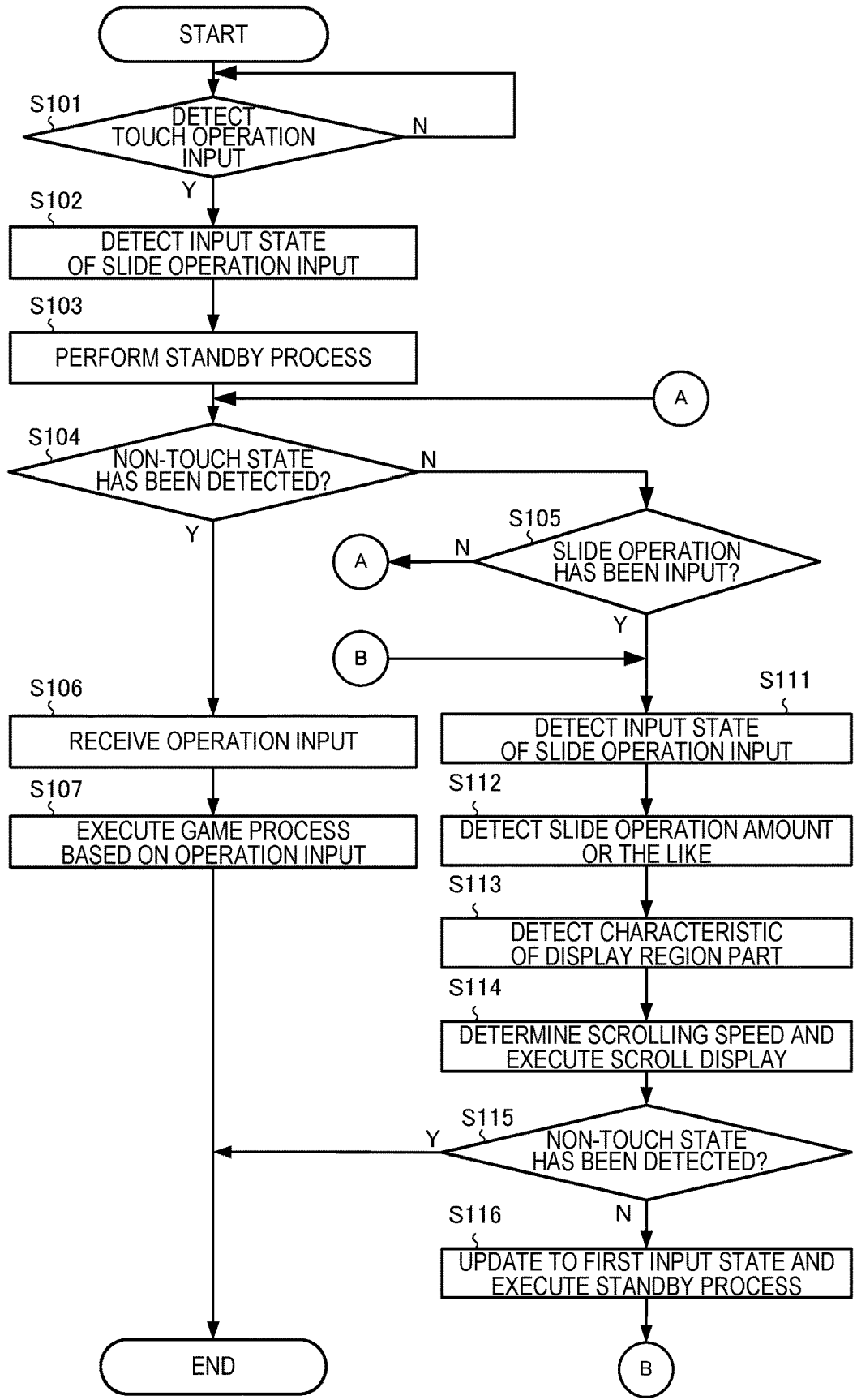
FIG. 17 is a flowchart for illustrating an operation of a disabling process executed by the terminal device according to one embodiment of the invention when the slide operation input is performed on an input reception area.

The operation of an input reception process including the scroll display process to be executed by the terminal device 20 is described below with reference to FIG. 17. Note that FIG. 17 is a flowchart for illustrating the operation of the input reception process including the scroll display process executed by the terminal device 20.

The operation illustrated in FIG. 8 is performed when implementing the disabling process (that is performed when a slide operation input is performed on the input reception area) during the game, and is performed by the terminal device 20 in principle. Note that part of the disabling process may be performed by the terminal device 20 in cooperation with the server 10.

In this operation, it is assumed that a predetermined game process has been executed in advance to enable a standby state for the touch operation input and the slide operation input, and that the game content including the display region part and the non-display region part to be displayed on the touch panel 12 have been formed.

In regard to this operation, a description is given of a case of controlling the scrolling speed or the scroll movement amount based on the characteristic of the non-display region part of the content together with the number of slide operation inputs or the touch area involved in the touching on the screen.

First, when the touch detection processing section 211 detects a touch operation input under a state in which any touch operation input has not been performed on the touch panel 12 (non-touch state) (Step S101), the input state detector 213 detects the input state involved in the touch operation input as a first input state (Step S102).

Specifically, the input state detector 213 detects, as the first input state involved in the touch operation input, the number of spots on the touch panel 12 being touched by the player or the touch area of the spot being touched. The input state detector 213 also detects a coordinate value of the indication position involved in the touch operation input on the touch panel 12.

Subsequently, the touch detection processing section 211 executes a standby process for waiting for a predetermined time period (for example, corresponding to one frame (1/60 second)) (Step S103) to determine whether or not a state in which the touch operation input is not being performed on the touch panel 12 (i.e., non-touch state after all the touch operation inputs have been finished) has been detected, and to determine, when it is determined that the non-touch state has not been detected, whether or not a slide operation has been performed on the touch panel 12 to directly follow the touch operation input (at least one touch operation input) (Steps S104 and S105).

At this time, when detecting the non-touch state after a lapse of a predetermined time period, the touch detection processing section 211 receives the operation input based on the indication position involved in the touch operation input (Step S106), and executes the game process based on the received operation input (Step S107) to terminate this operation.

Meanwhile, the touch detection processing section 211 advances to the process of Step S104 when determining that the non-touch state has not been detected and determining that a slide operation has not been performed on the touch panel 12 to directly follow the touch operation input, and advances to the process of Step S111 when determining that the non-touch state has not been detected and determining that a slide operation has been performed on the touch panel 12 to directly follow the touch operation input.

Subsequently, the input state detector 213 detects the input state involved in the slide operation input as a second input state (Step S111). Specifically, the input state detector 213 detects the number of spots on the touch panel 12 being touched by the player (i.e., the number of slide operation inputs being simultaneously executed) or the touch area being touched (i.e., the touch area of a region touched on the touch panel 12 to execute the slide operation input). The input state detector 213 also detects the coordinate value (of the indication position) on the touch panel 12 obtained when the second input state is detected.

Subsequently, the input state detector 213 detects the slide direction and the slide operation amount (distance on the touch panel 12) that are exhibited in the slide operation input from the first input state to the second input state (Step S112), and detects the characteristic of the non-display region part of the game content including a display forming part displayed on the touch panel 12 (Step S113).

Note that the input state detector 213 detects, as the characteristic of the non-display region part, the extent of the region size of the non-display region part of the game content, the number of enemy characters arranged in the non-display region part of the content for use in the game, or the type of the enemy character.

Subsequently, the display controller 212 determines the scrolling speed exhibited when the display region part of the content is scrolled or the scroll movement amount exhibited in the scrolling based on the detected input state and the characteristic exhibited by the non-display region part of the game content, and executes the scroll display process based on the scrolling speed or the scroll movement amount that has been determined (Step S114).

Subsequently, the touch detection processing section 211 determines whether or not the non-touch state has been detected after all the touch operation inputs have been finished (Step S115).

Subsequently, when determining that the non-touch state has not been detected, the touch detection processing section 211 updates the second input state to the first input state and executes the standby process for waiting for a predetermined time period (for example, corresponding to one frame (1/60 second)) (Step S116) to advance to the process of Step S111, while terminating this operation when determining that the non-touch state has been detected.

Note that, in this operation, when the scrolling speed or the scroll movement amount is controlled based only on the number of slide operation inputs or the touch area of a region touched on the screen, or when the scrolling speed or the scroll movement amount is controlled based only on the characteristic of the non-display region part of the content, the scrolling speed or the scroll amount may be determined in Step S114 without the execution of the process of any one of Steps S111 and S113 described above.

6. Others

The invention is not limited to the above embodiments. Various modifications and variations may be made of the above embodiments. Any term cited with a different term having a broader meaning or the same meaning at least once in the specification and the drawings can be replaced by the different term in any place in the specification and the drawings.

Although the above embodiments have been described taking an operation input performed during an RPG as an example, the above embodiments can similarly be applied to other games such as a battle game and a simulation game.

A single server 10 may provide each game to the terminal device 20, or a server system in which a plurality of servers 10 operate in cooperation may provide each game to the terminal device 20.

Although the above embodiments have been described taking an example in which the game provided by the server 10 is executed by the terminal device 20, each function of the processing section 200 of the terminal device 20 (except for the touch detection processing section 211) and the game program may be implemented and executed by the server 10, and the terminal device 20 may implement the game through an operation input and streaming image display.

Although the above embodiments have been described taking an example in which the terminal device according to the invention is applied to a game device, the terminal device according to the invention may be applied to any terminal device that allows the user to perform an operation input using a touch panel (e.g., smartphone, tablet-type information terminal device, personal computer, monitor, or TV).

The invention includes various other configurations substantially the same as the configurations described in connection with the above embodiments (e.g., a configuration having the same function, method, and results, or a configuration having the same objective and effects). The invention also includes a configuration in which an unsubstantial element described in connection with the above embodiments is replaced with another element. The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

REFERENCE SIGNS LIST

10: server, 20: terminal device, 200: processing section, 101: communication controller, 102: web processing section, 103: game calculation execution section, 104: game management section, 120: input section, 130: display section, 140: storage section, 142: main storage section, 144: game information, 146: user information, 180: information storage medium, 196: communication section, 200: processing section, 210: object space setting section, 211: touch detection processing section, 212: display controller, 213: input state detector, 214: movement processing section, 215: game calculation section, 216: virtual camera controller, 217: game management section, 220: drawing section, 230: sound processing section, 270: storage section, 271: main storage section, 272: image buffer, 273: user information, 260: input section, 262: detector, 280: information storage medium, 290: display section, 292: sound output section

The invention claimed is:

1. A terminal device for receiving an input on a touch panel on which a screen is displayed and to execute a game based on the received input, the terminal device comprising:
a processor programmed to:
perform a first detection process for detecting a touch operation on the touch panel;
perform a second detection process for detecting a slide operation on the touch panel directly following the touch operation detected by the first detection process;
determine a size of a physically continuous single area of the touch panel that is simultaneously touched during the slide operation; and
control a scroll display process for scrolling and moving a display region part of game content displayed on the screen based on the slide operation, such that:
at least one of (i) a scrolling speed, which represents a moving speed exhibited when the display region part of the game content is scrolled in the scroll display process, and (ii) a scroll movement amount, which represents a movement amount by which the game content is scrolled, is varied based on the determined size,
wherein the processor is also programmed to:
detect a non-display region part of the game content and a game circumstance with respect to the non-display region part; and
additionally control the at least one of (i) the scrolling speed and (ii) the scroll movement amount during the slide operation based on the detected game circumstance with respect to the non-display region part.

2. The terminal device according to claim 1, wherein the processor is programmed to:
detect at least one of:
a slide operation direction, and
a slide operation amount exhibited in the slide operation; and
control the scroll display process based on the detected one of the slide operation direction and the slide operation amount.

3. The terminal device according to claim 1, wherein the processor is programmed to:
detect a characteristic exhibited by the non-display region part of the game content; and
display the game content relating to the game on the screen based on the detected characteristic.

4. The terminal device according to claim 1, wherein the detected game circumstance with respect to the non-display region part of the game content includes at least two of:
an extent of a region size of the non-display region part of the game content,
a number of characters arranged in the non-display region part of the game content for use in the game,
a type of character arranged in the non-display region part of the game content, and
an occupancy rate of an object arranged in the non-display region part of the game content with respect to the non-display region part.

5. The terminal device according to claim 1, wherein the processor is programmed to execute a notification control process for notifying the scrolling speed or the scroll movement amount on the screen under the scroll display process.

6. A method of receiving an input that has been performed on a touch panel on which a screen is displayed, the method comprising:
performing a first detection process for detecting a touch operation on the touch panel;
performing a second detection process for detecting a slide operation on the touch panel directly following the touch operation detected by the first detection process;
determining a size of a physically continuous single area of the touch panel that is simultaneously touched during the slide operation; and
displaying game content relating to the game on the screen, and controlling a scroll display process for scrolling and moving a display region part of the game content displayed on the screen based on the slide operation, such that:

at least one of (i) a scrolling speed, which represents a moving speed exhibited when the display region part of the game content is scrolled in the scroll display process, and (ii) a scroll movement amount, which represents a movement amount by which the game content is scrolled, is varied based on the determined size, wherein the method also includes:

detecting a non-display region part of the game content and a game circumstance with respect to the non-display region part; and additionally controlling the at least one of (i) the scrolling speed and (ii) the scroll movement amount during the slide operation based on the detected game circumstance with respect to the non-display region part.

7. The terminal device according to claim 1, wherein the processor is programmed to:

reduce at least one of (i) the scrolling speed and (ii) the scroll movement amount, with a decreasing value of the determined size; and increase at least one of (i) the scrolling speed and (ii) the scroll movement amount, with an increasing value of the determined size.

8. The terminal device according to claim 1, wherein the processor is programmed to:

determine the size of the physically continuous single area of the touch panel that is simultaneously touched during the slide operation, such that:

a single touch point performing the slide operation is distinguished from multiple touch points that are not independent of each other, which are all used to perform the slide operation.

9. The method according to claim 6, comprising:

detecting at least one of:

a slide operation direction, and a slide operation amount exhibited in the slide operation; and controlling the scroll display process based on the detected one of the slide operation direction and the slide operation amount.

10. The method according to claim 6, comprising:

detecting a characteristic exhibited by the non-display region part of the game content; and displaying the game content relating to the game on the screen based on the detected characteristic.

11. The method according to claim 6, wherein the detected game circumstance with respect to the non-display region part of the game content includes at least two of:

an extent of a region size of the non-display region part of the game content, a number of characters arranged in the non-display region part of the game content for use in the game, a type of character arranged in the non-display region part of the game content, and an occupancy rate of an object arranged in the non-display region part of the game content with respect to the non-display region part.

12. The method according to claim 6, comprising:

executing a notification control process for notifying the scrolling speed or the scroll movement amount on the screen under the scroll display process.

13. The method according to claim 6, comprising:

reducing at least one of (i) the scrolling speed and (ii) the scroll movement amount, with a decreasing value of the determined size; and increasing at least one of (i) the scrolling speed and (ii) the scroll movement amount, with an increasing value of the determined size.

14. The method according to claim 6, comprising:

determining the size of the physically continuous single area of the touch panel that is simultaneously touched during the slide operation, such that:

a single touch point performing the slide operation is distinguished from multiple touch points that are not independent of each other, which are all used to perform the slide operation.

15. A non-transitory computer readable medium storing a program which, when executed by a computer that receives an input on a touch panel on which a screen is displayed and executes a game based on the received input, causes the computer to:

perform a first detection process for detecting a touch operation on the touch panel;

perform a second detection process for detecting a slide operation on the touch panel directly following the touch operation detected by the first detection process;

determine a size of a physically continuous single area of the touch panel that is simultaneously touched during the slide operation; and display game content relating to the game on the screen, and controlling a scroll display process for scrolling and moving a display region part of the game content displayed on the screen based on the slide operation, such that:

at least one of (i) a scrolling speed, which represents a moving speed exhibited when the display region part of the game content is scrolled in the scroll display process, and (ii) a scroll movement amount, which represents a movement amount by which the game content is scrolled, is varied based on the determined size, wherein the program also causes the computer to:

detect a non-display region part of the game content and a game circumstance with respect to the non-display region part; and additionally control the at least one of (i) the scrolling speed and (ii) the scroll movement amount during the slide operation based on the detected game circumstance with respect to the non-display region part.

* * * * *